US012391901B2

(12) United States Patent
Liu et al.

(10) Patent No.: US 12,391,901 B2
(45) **Date of Patent: *Aug. 19, 2025**

(54) ENZYMATIC POT AND PAN DETERGENT

(71) Applicant: ECOLAB USA INC., Saint Paul, MN (US)

(72) Inventors: Johnny Zhengrong Liu, Saint Paul, MN (US); Lyndal Jensen, Saint Paul, MN (US); Elena Werst, Saint Paul, MN (US); Charles A. Hodge, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,593

(22) Filed: Feb. 10, 2022

(65) Prior Publication Data

US 2022/0186150 A1 Jun. 16, 2022

Related U.S. Application Data

(63) Continuation of application No. 16/433,231, filed on Jun. 6, 2019, now Pat. No. 11,306,277.

(Continued)

(51) Int. Cl.

*C11D 1/75* (2006.01)
*C11D 1/14* (2006.01)

(Continued)

(52) U.S. Cl.

CPC ................ *C11D 3/386* (2013.01); *C11D 1/14* (2013.01); *C11D 1/16* (2013.01); *C11D 1/29* (2013.01);

(Continued)

(58) Field of Classification Search

CPC .... C11D 1/14; C11D 1/16; C11D 1/29; C11D 1/72; C11D 1/722; C11D 1/75;

(Continued)

(56) References Cited

U.S. PATENT DOCUMENTS 5,952,278 A 9/1999 Mao et al.
6,008,181 A 12/1999 Cripe et al.

(Continued)

FOREIGN PATENT DOCUMENTS

CN 1094515 C 11/2002
CN 102703249 A 10/2012

(Continued)

OTHER PUBLICATIONS

Ecolab USA Inc., "International Search Report and the Written Opinion of the International Searching Authority, or the Declaration", in connection with PCT/US2019/035706 filed Jun. 6, 2019, 26 pages, mailed Oct. 16, 2019.

*Primary Examiner* — Gregory R Delcotto

(74) *Attorney, Agent, or Firm* — McKee, Voorhees & Sease, PLC

(57) ABSTRACT

Detergent compositions are disclosed which provide superior cleaning and removal of proteinaceous and starchy soils. Applicants have discovered a surfactant package which acts to enhance and improve the performance of enzymes such as proteases and/or amylases. Compositions for pot and pan warewash detergents and soaks are disclosed, as well as their use in manual or dish machine cleaning.

18 Claims, 9 Drawing Sheets

Related U.S. Application Data

(60) Provisional application No. 62/681,796, filed on Jun. 7, 2018.

(51) Int. Cl.

| | |
|---|---|
| ***C11D 1/16*** | (2006.01) |
| ***C11D 1/29*** | (2006.01) |
| ***C11D 1/40*** | (2006.01) |
| ***C11D 1/62*** | (2006.01) |
| ***C11D 1/72*** | (2006.01) |
| ***C11D 1/722*** | (2006.01) |
| ***C11D 1/83*** | (2006.01) |
| ***C11D 1/90*** | (2006.01) |
| ***C11D 1/94*** | (2006.01) |
| ***C11D 3/04*** | (2006.01) |
| ***C11D 3/20*** | (2006.01) |
| ***C11D 3/34*** | (2006.01) |
| ***C11D 3/386*** | (2006.01) |

(52) U.S. Cl.

CPC .................. *C11D 1/40* (2013.01); *C11D 1/62* (2013.01); *C11D 1/72* (2013.01); *C11D 1/722* (2013.01); *C11D 1/75* (2013.01); *C11D 1/83* (2013.01); *C11D 1/90* (2013.01); *C11D 1/94* (2013.01); *C11D 3/042* (2013.01); *C11D 3/2044* (2013.01); *C11D 3/3409* (2013.01); *C11D 3/38618* (2013.01)

(58) Field of Classification Search

CPC .... C11D 1/83; C11D 1/90; C11D 1/94; C11D 3/2044; C11D 3/042; C11D 3/38618

USPC ....... 510/235, 237, 238, 393, 422, 427, 428, 510/432, 503, 505, 506

See application file for complete search history.

(56) References Cited

U.S. PATENT DOCUMENTS

| | | | |
|---|---|---|---|
| 6,034,048 | A | 3/2000 | Talley |
| 6,046,152 | A | 4/2000 | Vinson et al. |
| 6,087,309 | A | 7/2000 | Vinson et al. |
| 6,239,093 | B1 | 5/2001 | Foley et al. |
| 6,432,897 | B1 | 8/2002 | Cable |
| 6,528,070 | B1 | 3/2003 | Bratescu et al. |
| 6,706,679 | B1 | 3/2004 | Bergeron et al. |
| 6,723,692 | B2 | 4/2004 | Foley et al. |
| 6,774,099 | B1 | 8/2004 | Scheibel et al. |
| 6,903,064 | B1 | 6/2005 | Kasturi et al. |
| 11,306,277 | B2 * | 4/2022 | Liu ........................ C11D 3/386 |
| 2002/0151449 | A1 | 10/2002 | Fox et al. |
| 2005/0148059 | A1 | 7/2005 | Estell et al. |
| 2006/0035807 | A1 | 2/2006 | Kasturi et al. |
| 2007/0272277 | A1 | 11/2007 | Jeffreys |
| 2008/0233057 | A1 | 9/2008 | Petit et al. |
| 2009/0111161 | A1 | 4/2009 | Jones et al. |
| 2012/0053108 | A1 | 3/2012 | Glenn, Jr. et al. |
| 2014/0148374 | A1 | 5/2014 | Man et al. |
| 2014/0196220 | A1 | 7/2014 | Man et al. |
| 2015/0203443 | A1 | 7/2015 | Klostermann et al. |
| 2016/0015031 | A1 | 1/2016 | Pesaro et al. |
| 2016/0201014 | A1 | 7/2016 | Perez-Garcia et al. |
| 2016/0201015 | A1 | 7/2016 | Dihora et al. |
| 2017/0121652 | A1 | 5/2017 | Zuniga et al. |
| 2017/0130167 | A1 | 5/2017 | Man et al. |
| 2017/0298299 | A1 | 10/2017 | Backer et al. |
| 2017/0321153 | A1 | 11/2017 | Hunt, Jr. et al. |
| 2018/0023036 | A1 | 1/2018 | Vandenberghe et al. |
| 2018/0087007 | A1 | 3/2018 | Vandenberghe et al. |

FOREIGN PATENT DOCUMENTS

| | | | |
|---|---|---|---|
| EP | 0888434 | B1 | 1/1999 |
| JP | 10505374 | A | 5/1998 |
| JP | 11501066 | A | 1/1999 |
| JP | 200280892 | A | 3/2002 |
| JP | 2004503661 | A | 2/2004 |
| JP | 2011501961 | A | 1/2011 |
| JP | 2011524940 | A | 9/2011 |
| JP | 2013537580 | A | 10/2013 |
| JP | 2016500397 | A | 1/2016 |
| WO | 199507971 | A1 | 3/1995 |
| WO | 0135905 | A2 | 5/2001 |

* cited by examiner

ENZYMATIC POT AND PAN DETERGENT

CROSS-REFERENCE TO RELATED APPLICATION

This is a Continuation application of U.S. Ser. No. 16/433,231, filed Jun. 6, 2019, which application claims priority under 35 U.S.C. § 119 to Provisional U.S. Application Ser. No. 62/681,796, filed on Jun. 7, 2018, which are herein incorporated by reference in their entirety including without limitation, the specification, claims, and abstract, as well as any figures, tables, or examples thereof.

FIELD

Warewash detergent compositions are disclosed that optimize the performance of enzymes present in the formulation for removing protein, starch and other hard to remove soils. Compositions employ the use of synergistic enzyme-surfactant combinations and importantly avoid those that have a deleterious effect on enzyme performance in detergents. Methods employing the detergent compositions for cleaning ware, for soaking pots and pans, and methods of making the compositions are also included.

BACKGROUND

Surfactants are the single most important cleaning ingredient in cleaning products. Surfactants reduce the surface tension of water by adsorbing at the liquid-gas interface. They also reduce the interfacial tension between oil and water by adsorbing at the liquid-liquid interface. When dissolved in water, surfactants give a product the ability to remove soil from surfaces. Each surfactant molecule has a hydrophilic head that is attracted to water molecules and a hydrophobic tail that repels water and simultaneously attaches itself to oil and grease in soil. These opposing forces loosen the soil and suspend it in the water.

Surfactants do the basic work of detergents and cleaning compositions by breaking up stains and keeping the soil in the water solution to prevent re-deposition of the soil onto the surface from which it has just been removed. Surfactants disperse soil that normally does not dissolve in water. Environmental regulations, consumer habits, and consumer practices have forced new developments in the surfactant industry to produce lower-cost, higher-performing, and environmentally friendly products.

Proteinaceous, starch and fatty soils have long proven difficult in warewash applications. In the past, cleaning compositions that were the most efficacious in removing these types of soils included phosphate-containing components. These cleaning compositions usually included phosphate-containing components such as trisodium phosphate and sodium tripolyphosphate (STPP), which are now banned due to environmental concerns. Since the ban, there has been a gap in performance of cleaning compositions.

The use of enzymes has been implemented to improve cleaning for more than 30 years in washing formulations. Enzymes used in such formulations comprise proteases, lipases, amylases, cellulases, mannosidases as well as other enzymes or mixtures thereof. Commercially the most important enzymes are proteases. Many of these proteases have different properties such as e.g. wash performance, thermal stability, storage stability or catalytic activity that limit their effectiveness in ware washing applications. These properties as well as deleterious interactions with other detergent components make the improvement of protease performance in ware washing applications desirable.

It is therefore an object of the present disclosure to provide synergistic combinations of surfactants and proteases that improve cleaning performance. Accordingly, it is an objective to develop a warewash detergent/pot and pan soak composition which provides cleaning benefits, particularly for proteinaceous, starchy, oily and fatty soils, which is environmentally safe.

BRIEF SUMMARY

Applicants have identified specific combinations of surfactants and enzymes in warewash detergent and pot and pan presoak compositions that optimize the cleaning ability of enzymes and often act synergistically to improve cleaning. These combinations provide superior protein and starchy soil removal when compared to traditional warewash detergent compositions where the enzyme-surfactant interaction is not optimized.

In one embodiment, a warewash detergent composition comprises the surfactant-enzyme component of the warewash detergent composition. The enzyme component can comprise a protease, an amylase or, in a preferred embodiment both enzymes for optimal removal of protein and starchy soils. Applicants have further identified that the anionic surfactant linear alkylbenzene sulfonate has a deleterious effect on soil removal of each of the enzymes and detergents should be essentially free of or avoid the use of this surfactant. This is particularly surprising as the closely related anionic surfactants sodium laurel ether sulfate and sodium olefin sulfonate are preferred surfactants which optimize cleaning ability and performance of detergents comprising one or both of these surfactants.

In an embodiment, Applicants have found that the combination of sodium olefin sulfonate, sodium laurel ether sulfate, amine oxide and cocamidopropyl betaine all act synergistically with protease.

Anionic surfactants, while desirable for their foaming properties, can also have a negative impact on amylase and in an embodiment the detergent or surfactant package can include nonionic cosurfactants to mitigate these effects. These typically include branched nonionic surfactants such as polyethylene glycol trimethylnonyl ether or branched C8 ethyl hexyl $(PO)_{4\text{-}8}(EO)_{3,6,9,\ or\ 14}$ nonionic extended surfactants.

In a further embodiment, a method of cleaning is disclosed comprising: applying a warewash detergent/soak composition to a substrate surface, wherein the detergent composition comprises the enzyme-surfactant package, wherein the detergent composition is effective for proteinaceous or starchy soil removal, and thereafter rinsing said surface to remove residual detergent and debris. In a preferred embodiment, the detergent is used in a dish washing sink. In some embodiments, the detergent is a soaking composition that can be applied prior to washing in a dish machine or 2- or 3-compartment sink.

The cleaning composition also includes any of a variety of other components useful for warewash cleaning compositions. For example, the composition can include components such as chelants, alkali, metal protectors, fillers, enzyme stabilizers, builders, oxidizers, preservatives, corrosion inhibitors, buffers, fragrance etc.

Articles which require such cleaning include any article with a surface such as plasticware, cookware, dishware, flatware, glasses, cups, hard surfaces, glass surfaces, eating and cooking utensils, and dishes. Additional embodiments also include the cleaning of plastic ware. The types of plastics that can be cleaned include but are not limited to, those that include polycarbonate polymers (PC), acrilonitrile-butadiene-styrene polymers (ABS), and polysulfone polymers (PS). Another exemplary plastic that can be cleaned includes polyethylene terephthalate (PET).

The compositions can be provided as a liquid, ready to use solution, concentrate or solid. In one embodiment, the cleaning compositions may be provided as a concentrate such that the cleaning composition is substantially free of any added water or the concentrate may contain a nominal amount of water. The concentrate can be formulated without any water or can be provided with a relatively small amount of water in order to reduce the expense of transporting the concentrate. In use, the concentrate is diluted to form a use composition and then applied to ware for cleaning.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

DETAILED DESCRIPTION

Figure 1:
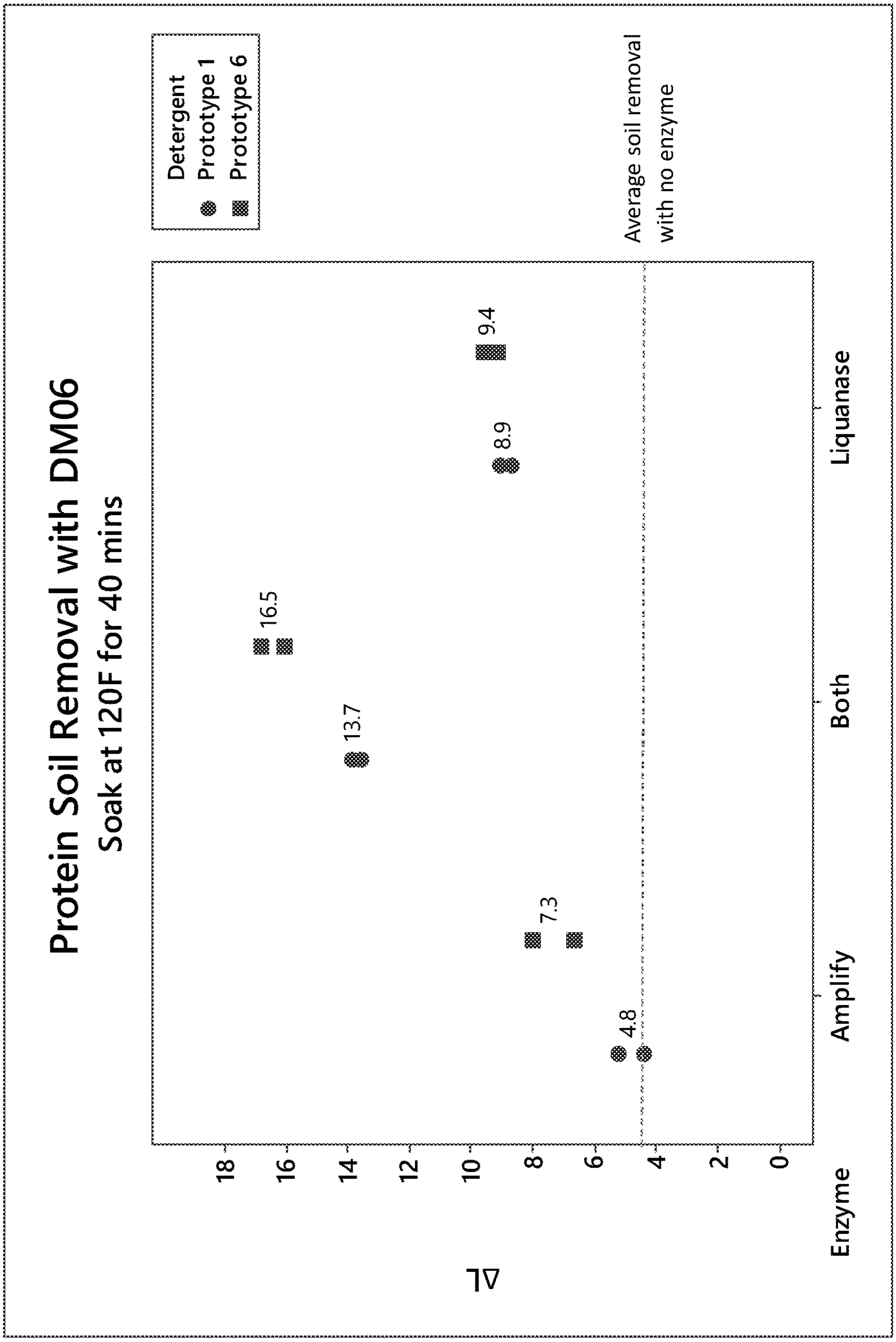
FIG. 1. Protein soil removal comparison using DM06 for detergent prototypes.

Warewash detergent compositions are disclosed employing synergistic surfactant-enzyme combinations that improve proteinaceous and/or starchy soil removal and are free of phosphate containing components.

The embodiments disclosed herein are not limited to particular detergent compositions, which can vary and are understood by skilled artisans. It is further to be understood that all terminology used herein is for the purpose of describing particular embodiments only, and is not intended to be limiting in any manner or scope.

For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which various embodiments pertain. Many methods and materials similar, modified, or equivalent to those described herein can be used in the practice of the embodiments contemplated herein without undue experimentation, the preferred materials and methods are described herein. In describing and claiming the embodiments, the following terminology will be used in accordance with the definitions set out below.

As used herein, the term "about" modifying the quantity of a component or ingredient in the compositions or employed in the methods refers to variation in the numerical quantity that can occur, for example, through typical measuring and liquid handling procedures used for making concentrates or use solutions in the real world; through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

The term "surfactant" or "surface active agent" refers to an organic chemical that when added to a liquid changes the properties of that liquid at a surface.

"Cleaning" means to perform or aid in soil removal, bleaching, de-scaling, de-staining, microbial population reduction, rinsing, or combination thereof.

As used herein, the term "substantially free" refers to compositions completely lacking the component or having such a small amount of the component that the component does not affect the performance of the composition. The component may be present as an impurity or as a contaminant and shall be less than 0.5 wt. %. In another embodiment, the amount of the component is less than 0.1 wt. % and in yet another embodiment, the amount of component is less than 0.01 wt. %.

As used herein, a "solid" cleaning composition refers to a cleaning composition in the form of a solid such as a powder, a particle, an agglomerate, a flake, a granule, a pellet, a tablet, a lozenge, a puck, a briquette, a brick, a solid block, a unit dose, or another solid form known to those of skill in the art. The term "solid" refers to the state of the detergent composition under the expected conditions of storage and use of the solid detergent composition. In general, it is expected that the detergent composition will remain in solid form when exposed to elevated temperatures of 100° F. and preferably 120° F. A cast, pressed, or extruded "solid" may take any form including a block. When referring to a cast, pressed, or extruded solid it is meant that the hardened composition will not flow perceptibly and will substantially retain its shape under moderate stress, pressure, or mere gravity. For example, the shape of a mold when removed from the mold, the shape of an article as formed upon extrusion from an extruder, and the like. The degree of hardness of the solid cast composition can range from that of a fused solid block, which is relatively dense and hard similar to concrete, to a consistency characterized as being malleable and sponge-like, similar to caulking material.

The terms "actives" or "percent actives" or "percent by weight actives" or "actives concentration" are used interchangeably herein and refer to the concentration of those ingredients involved in cleaning expressed as a percentage minus inert ingredients such as water or salts.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

The terms "feed water," "dilution water," and "water" as used herein, refer to any source of water that can be used with the methods and compositions disclosed. Suitable water sources include a wide variety of both quality and pH, and include but are not limited to, city water, well water, water supplied by a municipal water system, water supplied by a private water system, and/or water directly from the system or well. Water can also include water from a used water reservoir, such as a recycle reservoir used for storage of recycled water, a storage tank, or any combination thereof. Water also includes food process or transport waters. It is to be understood that regardless of the source of incoming water for systems and methods, the water sources may be further treated within a manufacturing plant. For example, lime may be added for mineral precipitation, carbon filtration may remove odoriferous contaminants, additional chlorine or chlorine dioxide may be used for disinfection or water may be purified through reverse osmosis taking on properties similar to distilled water.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned include but are not limited to, those that include polycarbonate polymers (PC), acrilonitrile-butadiene-styrene polymers (ABS), and polysulfone polymers (PS). Another exemplary plastic that can be cleaned includes polyethylene terephthalate (PET).

The terms "weight percent," "wt. %," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt. %," etc.

The methods and compositions may comprise, consist essentially of, or consist of the components and ingredients as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Warewash/Presoak Compositions

The detergent compositions of the invention include one or more enzymes that help to clean difficult to remove soils from ware. Applicants have identified specific surfactants and various formulations which optimize the activity of these enzymes. The detergents can include a protease and/or an amylase and in a preferred embodiment both enzymes are included to optimize both starchy and protein soil removal.

Protease

Proteases can cleave complex, macromolecular protein structures present in soil residues into simpler short chain molecules which are, of themselves, more readily desorbed from surfaces, solubilized or otherwise more easily removed by cleaning solution containing the proteases. Proteases are generally classified into serine proteases, thiol proteases, carboxyl proteases and metal proteases, depending upon their active sites. They may also be classified into three of microorganism-, plant- and animal-derived proteases, depending upon their origins. Microorganism-derived proteases are further classified into bacteria-, actinomycete-, mold- and yeast-derived proteases.

Any suitable protease may be included in the detergent. In different examples, the protease included in the detergent can be derived from a plant, an animal, or a microorganism. In one example, the detergent includes a protease derived from a microorganism, such as a yeast, a mold, or a bacterium. For example, the detergent may include a serine protease, e.g., derived from a strain of *Bacillus* such as *Bacillus subtilis* or *Bacillus licheniformis*. These proteases can include native and recombinant subtilisins. The protease can be purified or a component of a microbial extract, and either a wild type or variant (either chemical or recombinant). In some examples, the protease is selected so that it is active at a pH of about 6 to about 12 and at temperatures in a range from about 20° C. to about 80° C.

Examples of commercially available proteases that may be incorporated in the detergent include those sold under the trade names Alcalase®, Savinase® (e.g., Savinase® Ultra 16L), Primase®, Durazym®, Esperase®, Coronase®, Blaze®, Liquanase®, Progress Uno®, Lavergy Pro®, Maxatase®, Maxacal®, Maxapem®, Opticlean®, Optimase® PR, Effectenz®, Purafect®, and Purafect OX. Mixtures of different protease enzymes may also be incorporated in the detergent. Further, while various specific enzymes have been described, it should be appreciated that any protease which can confer the desired proteolytic activity to the composition may be used and the disclosure is not limited to any specific protease. In a preferred embodiment, the enzyme is Savinase® or Liquanase®.

When used, the protease may be incorporated into the detergent in an amount sufficient to yield effective cleaning and removal of protein soil structures, e.g., of the type that may accumulate on a ware surface. The protease is included in an amount that provides the desired enzymatic activity when the warewashing composition is provided as a use/liquid composition. Exemplary ranges of the enzyme level in detergent compositions include between about 0.001 and about 20 wt. %, more preferably between about 0.01 wt. % and about 15 wt. %, and most preferably between about 0.05 wt. % and about 10 wt. %.

Amylase

An amylase enzyme can digest starch molecules present in soil residues into simpler short chain molecules (e.g., simple sugars) which are, of themselves, more readily desorbed from surfaces, solubilized or otherwise more easily removed by the cleaning solution containing the amylases. An amylase included in compositions of the invention can be derived from a plant, an animal, or a microorganism. In one example, the composition includes an amylase derived from a microorganism, such as a yeast, a mold, or a bacterium. For example, the composition may include an amylase derived from a *Bacillus*, such as *B. licheniformis, B. amyloliquefaciens, B. subtilis*, or *B. stearothermophilus*. The amylase can be purified or a component of a microbial extract, and either a wild type or variant (either chemical or recombinant). In some examples, the composition includes an alpha amylase (α-amylase).

Examples of amylase enzymes that may be employed in the composition include those sold under the trade names Rapidase by Gist-Brocades® (Netherlands), Termamyl®, Fungamyl®, Duramyl®, Amplify®, Amplify Prime®, Stainzyme® or Stainzyme Plus® by Novozymes, Opitmase® AA, Preferenz®, or Purastar® by DuPont, and the like. A mixture of amylases can also be used. The amylase enzymes may have activity in the pH range of about 6-12 and at temperatures from about 20° C. to 80° C.

When used, the amylase may be incorporated into the composition at an amount sufficient to yield effective cleaning and removal of starch soil structures, e.g., of the type that may accumulate on a ware surface. The amylase is included in an amount that provides the desired enzymatic activity when the warewashing composition is provided as a use/liquid composition. Exemplary ranges of the enzyme level in detergent compositions include between about 0.001 and about 20 wt. %, more preferably between about 0.01 and about 15 wt. %, and most preferably between about 0.05 wt. % and about 10 wt. %.

Surfactants

The composition does not include, or is substantially free of a surfactant that has an antagonistic interaction with protease and/or amylase. Such surfactants include primarily the anionic surfactant, linear alkylbenzene sulfonate, while other closely related anionic surfactants have a compatible or even synergistic effect on the enzymes, such as, for example sodium olefin sulfonate or sodium laurel ether sulfate.

In an embodiment, the surfactant component can include any surfactant typically used in pot and pan/warewash detergent/soaking compositions, provided that the composition is free of any anionic surfactant which deleteriously interacts with the enzymes (linear alkylbenzene sulfonate).

Exemplary surfactants that can be used are commercially available from a number of sources. For a discussion of surfactants, see Kirk-Othmer, Encyclopedia of Chemical Technology, Third Edition, volume 8, pages 900-912. When the composition includes a cleaning agent, the cleaning agent can be provided in an amount effective to provide a desired level of cleaning.

Anionic surfactants useful in detergent compositions include, for example, carboxylates such as alkylcarboxylates (carboxylic acid salts) and polyalkoxycarboxylates, alcohol ethoxylate carboxylates, nonylphenol ethoxylate carboxylates, and the like; sulfonates such as alkylsulfonates, alkylbenzenesulfonates (except linear alkylbenzene sulfonate), alkylarylsulfonates, sulfonated fatty acid esters, and the like; sulfates such as sulfated alcohols, sulfated alcohol ethoxylates, sulfated alkylphenols, alkylsulfates, sulfosuccinates, alkylether sulfates, and the like; and phosphate esters such as alkylphosphate esters, and the like. The composition includes one or more anionic surfactants, preferably alkyl alkoxylated sulfates, alkyl sulfates, or alkyl sulfonates and the like. Exemplary preferred anionic surfactants include sodium laurel ether sulfate, sodium olefin sulfonate, and fatty alcohol sulfates. In a preferred embodiment the anionic surfactants include sodium olefin sulfonate and sodium laurel ether sulfate and said components are present in a ratio of about 4 parts sodium olefin sulfonate to about 1 part sodium laurel ether sulfate.

Nonionic surfactants useful in the detergent composition include, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark PLURONIC® (BASF-Wyandotte), and the like; and other like nonionic compounds. Silicone surfactants such as the ABIL® B8852 can also be used.

In a preferred embodiment the nonionic surfactant is alcohol alkoxylate containing both ethylene and propylene segments, guerbet alcohol ethoxylate, or polyethylene glycol trimethyl nonyl ether or any combination thereof.

Cationic surfactants that can be used in the detergent composition include amines such as primary, secondary and tertiary monoamines with $C_{1-8}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$) dimethylbenzyl ammonium chloride, n-tetradecyldimethylbenzylammonium chloride monohydrate, a naphthylene-substituted quaternary ammonium chloride such as dimethyl-1-naphthylmethylammonium chloride, and the like. The cationic surfactant can be used to provide sanitizing properties.

Amphoteric or zwitterionic surfactants that can be used in the detergent composition include betaines, sultaines, amine oxides, imidazolines, and propionates. In a preferred embodiment the amphoteric surfactant is cocamidopropyl betaine and/or amine oxide.

When amylase is present in the detergent, applicants have found that it is desirable to include one or more nonionic cosurfactants to counter the effects of the anionic surfactant on amylase performance. Examples of effective cosurfactants include the nonionic surfactant alcohol alkoxylate containing both ethylene and propylene segments, guerbet alcohol ethoxylate, or polyethylene glycol trimethyl nonyl ether as well as branched secondary nonionic surfactants such as polyethylene glycol trimethyl nonyl ether, or branched C8 ethyl hexyl $(PO)_{4-8}(EO)_{3,6,9,\ or\ 14}$ nonionic extended surfactants.

Applicants have found that the combination of sodium olefin sulfonate, sodium laurel ether sulfate, amine oxide and cocamidopropyl betaine all act synergistically with protease. In another embodiment the anionic surfactants are present in a ratio of approximately 4:1 sodium olefin sulfonate to sodium laurel ether sulfonate.

The total anionic surfactant present in the detergent is from about 5 wt. % to about 55 wt. %, preferably from about 8 wt. % to about 50 wt. % and most preferably from about 10 wt. % to about 45 wt. %.

The amphoteric/nonionic surfactant is present in an amount of from about 0.01 wt. % to about 35 wt. %, from about 0.5 wt. % to about 30 wt. % and most preferably from about 1 wt. % to about 25 wt. %.

The additional nonionic co-surfactant when amylase is present can include from about 0.01 wt. % to about 15 wt. %, from about 0.1 wt. % to about 10 wt. % and most preferably from about 0.5 wt. % to about 5 wt. %.

In an embodiment the detergent can include additional surfactant in addition to those listed above. The total surfactant present in said formulas can include from about 10 wt. % to about 60 wt. %, more preferably in a range between about 15 wt. % and 55 wt. %, and most preferably in a range between about 20 wt. % and 50 wt. %.

In an embodiment the compositions include a surfactant enzyme package for inclusion in various cleaning compositions. An embodiment includes protease and sodium olefin sulfonate, sodium laurel ether sulfate, amine oxide and cocamidopropyl betaine. In another embodiment the package includes amylase and protease and sodium olefin sulfonate, sodium laurel ether sulfate, amine oxide and cocamidopropyl betaine along with one or more branched secondary nonionic cosurfactants. The compositions are free of linear alkylbenzene sulfonate and the packages preferably have a ratio of about 4 parts sodium olefin sulfonate to about 1 part sodium laurel ether sulfate. In another embodiment the packet includes both amylase and protease.

Viscosity Enhancer

The detergent compositions can optionally include a minor but effective amount of one or more of a viscosity enhancer or filler. Some examples of suitable viscosity enhancers may include sodium chloride, starch, sugars, $C_1$-$C_{10}$ alkylene glycols such as propylene glycol, sulfates, PEG, urea, sodium acetate, magnesium sulfate, sodium acetate, magnesium sulfate, sodium carbonate and the like. In some embodiments, a filler can be included in an amount in the range of up to about 50 wt. %, and in some embodiments, a range of about 0.1 wt % to about 25 wt. %, from about 0.5 wt. % to about 20 wt. % and finally from about 1 wt. % to about 15 wt. %.

Carrier

In some embodiments, the compositions of the present invention include a carrier. The carrier provides a medium which dissolves, suspends, or carries the other components of the composition. The composition of the invention includes a suitable carrier which is preferably an aqueous carrier, most preferably water, suitably deionized water. The carrier is present in an amount of from 0 to 99 wt. %, preferably from about 1 to 80 wt. % and more preferably from about 10 wt-% to about 60 wt-%, to make up the remainder of the composition to a total of 100 wt %, in addition to the components described above to form the concentrate composition which may be further diluted as described herein to form a use solution.

Stabilizing Agents

The detergent composition may also include stabilizing agents. Examples of suitable stabilizing agents include, but are not limited to: borate, calcium/magnesium ions, propylene glycol, and mixtures thereof. The detergent need not include a stabilizing agent, but when the detergent includes a stabilizing agent, it can be included in an amount that provides the desired level of stability of the composition. Exemplary ranges of the stabilizing agent include up to approximately 20% by weight, between approximately 0.05% and approximately 15% by weight, and between approximately 0.1% and approximately 10% by weight, and approximately 1% and approximately 5% by weight.

Preservative

The detergent composition may optionally include one or more preservatives and/or biocides. Many different types of preservatives and/or biocides can be used in the detergent composition. Furthermore, one or more preservatives and/or biocides can be used in the detergent composition. Non-limiting of examples of preservatives that can be used in the detergent composition include, but are not limited to, mildewstat or bacteriostat, methyl, ethyl and propyl parabens, short chain organic acids (e.g. acetic, lactic and/or glycolic acids), bisguanidine compounds (e.g., Dantogard and/or Glydant) and/or short chain alcohols (e.g. ethanol and/or IPA). Non-limiting examples of mildewstat or bacteriostat include, but are not limited to, mildewstats (including non-isothiazolinones compounds) including Proxel GXL and Vantocil IB, from Avecia Corporation, Kathon GC, a 5-chloro-2-methyl-4-isothiazolin-3-one, KATHON ICP, a 2-methyl-4-isothiazolin-3-one, and a blend thereof, and KATHON 886, a 5-chloro-2-methyl-4-isothiazolin-3-one, and Neolone M-10, all available from Rohm and Haas Company; BRONOPOL, a 2-bromo-2-nitropropane-1, 3-diol, from Boots Company Ltd., PROXEL CRL, a propyl-p-hydroxybenzoate, from ICI PLC; NIPASOL M, an o-phenyl-phenol, sodium salt, from Nipa Laboratories Ltd., DOWICIDE A, a 1,2-Benzoisothiazolin-3-one, Dowacil 75, and Bioban, all from Dow Chemical Co., and IRGASAN DP 200, a 2,4,4'-trichloro-2-hydroxydiphenylether, from Ciba-Geigy A.G, and Surcide P from Surety Laboratories, DantogardPlus (e.g., 1,3-Bis(hydroxymethyl)-5,5-dimethylhydantoin and hydroxymethyl-5,5-dimethylhydantoin) commercially available from Lonza, Bioban DXN (e.g., dimethoxane) commercially available from Angus, etc. Non-limiting examples of biocides include quaternary ammonium compounds and phenolics. Non-limiting examples of these quaternary compounds include benzalkonium chlorides and/or substituted benzalkonium chlorides, di($C_6$-$C_{14}$)alkyl di short chain ($C_{1-4}$ alkyl and/or hydroxyalkl) quaternary ammonium salts, N-(3-chloroallyl) hexaminium chlorides, benzethonium chloride, methylbenzethonium chloride, and cetylpyridinium chloride. Other quaternary compounds include the group consisting of dialkyldimethyl ammonium chlorides, alkyl dimethylbenzylammonium chlorides, dialkylmethylbenzylammonium chlorides, and mixtures thereof, wherein the alkyl radicals may be C1 to C24. Biguanide antimicrobial actives include, but not limited to, polyhexamethylene biguanide hydrochloride, p-chlorophenyl biguanide; 4-chlorobenzhydryl biguanide, halogenated hexidine such as, but not limited to, chlorhexidine (1,1'-hexamethylene-bis-5-(4-chlorophenyl biguanide) and its salts are also in this class. When one or more preservatives and/or biocides are included in the detergent composition, the amount of preservative and/or biocide is at least about 0.001 weight percent and less than about 1 weight percent, typically about 0.001-1 weight percent, more typically about 0.005-0.5 weight percent, still more typically about 0.01-0.1 weight percent.

Reducing Agent

A reducing agent may be included in the detergent to further stabilize the enzyme. The reducing agent, includes a sulfite such as sodium sulfite, sodium metasulfite, sodium phosphite. Without being bound by theory, it is believed that the addition of sulfite, or similar material, enhances the ability for the enzyme to penetrate the starch structure and is effective in the absence of other enzyme-stabilizing agents. This is similar to the technique of acid hydrolysis modification by sulfuric acid. The modification improves the gelling capability of the starch. Such gelling capability results in the starch molecule absorbing extra water. It is believed that the absorption of such extra water allows increased penetration and thereby quicker removal of the starch than with amylase alone.

Additional Components

The detergent composition can include other additives such as chelants, metal protectors, water conditioning polymers, bleaching agents, detergent builders, hardening agents or solubility modifiers, defoamers, anti-redeposition agents, threshold agents, dispersants, aesthetic enhancing agents (i.e., dye, perfume), and the like. Adjuvants and other additive ingredients will vary according to the type of composition being manufactured. It should be understood that these additives are optional and need not be included in the cleaning composition. When they are included, they can be included in an amount that provides for the effectiveness of the particular type of component.

Alkalinity Source

The detergent compositions can include an alkalinity source. Exemplary alkalinity sources include alkali metal carbonates and/or alkali metal hydroxides.

Alkali metal carbonates used in the formulation of detergents are often referred to as ash-based detergents and most often employ sodium carbonate. Additional alkali metal carbonates include, for example, sodium or potassium carbonate. In aspects of the invention, the alkali metal carbonates are further understood to include metasilicates, silicates, bicarbonates and sesquicarbonates. According to the invention, any "ash-based" or "alkali metal carbonate" shall also be understood to include all alkali metal carbonates, metasilicates, silicates, bicarbonates and/or sesquicarbonates.

Alkali metal hydroxides used in the formulation of detergents are often referred to as caustic detergents. Examples of suitable alkali metal hydroxides include sodium hydroxide, potassium hydroxide, and lithium hydroxide. Exemplary alkali metal salts include sodium carbonate, potassium carbonate, and mixtures thereof. The alkali metal hydroxides may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution.

In addition to the first alkalinity source, the detergent composition may comprise a secondary alkalinity source. Examples of useful secondary alkaline sources include, but are not limited to: metal silicates such as sodium or potassium silicate or metasilicate; metal carbonates such as sodium or potassium carbonate, bicarbonate, sesquicarbonate; metal borates such as sodium or potassium borate; and ethanolamines and amines. Such alkalinity agents are commonly available in either aqueous or powdered form, either of which is useful in formulating the present detergent compositions.

Chelant

The compositions can also include a chelant at a level of from 0.01% to 25%, preferably from 0.05% to 20%, more preferably from 0.1% to 15% by weight of total composition. Chelation herein means the binding or complexation of a bi- or multidentate ligand. These ligands, which are often organic compounds, are called chelants, chelators, chelating agents, and/or sequestering agent. Chelating agents form multiple bonds with a single metal ion. Chelants, are chemicals that form soluble, complex molecules with certain metal ions, inactivating the ions so that they cannot normally react with other elements or ions to produce precipitates or scale. The ligand forms a chelate complex with the substrate. The term is reserved for complexes in which the metal ion is bound to two or more atoms of the chelant. Chelants are those having crystal growth inhibition properties, i.e. those that interact with the small calcium and magnesium carbonate particles preventing them from aggregating into hard scale deposit. The particles repel each other and remain suspended in the water or form loose aggregates which may settle. These loose aggregates easily rinse away and do not form a deposit.

Suitable chelating agents can be selected from the group consisting of amino carboxylates (this may be the same amino carboxylate that is used for metal protection, or an additional further amino carboxylate), amino phosphonates, polyfunctionally-substituted aromatic chelating agents and mixtures thereof. Preferred chelants for use herein are weak chelants such as the amino acids based chelants and preferably citrate, tartrate, and glutamic-N,N-diacetic acid and derivatives and/or Phosphonate based chelants and preferably Diethylenetriamine penta methylphosphonic acid.

Amino carboxylates include ethylenediaminetetra-acetates, N-hydroxyethylethylenediaminetriacetates, nitrilotriacetates, ethylenediamine tetrapro-prionates, triethylenetetraaminehexacetates, diethylenetriaminepentaacetates, and ethanoldi-glycines, alkali metal, ammonium, and substituted ammonium salts therein and mixtures therein. As well as MGDA (methyl-glycine-diacetic acid), and salts and derivatives thereof and GLDA (glutamic-N,N-diacetic acid) and salts and derivatives thereof. GLDA (salts and derivatives thereof) is especially preferred, with the tetrasodium salt thereof being especially preferred.

Other suitable chelants include amino acid based compound or a succinate based compound. The term "succinate based compound" and "succinic acid based compound" are used interchangeably herein. Other suitable chelants are described in U.S. Pat. No. 6,426,229. Particular suitable chelants include; for example, aspartic acid-N-monoacetic acid (ASMA), aspartic acid-N,N-diacetic acid (ASDA), aspartic acid-N-monopropionic acid (ASMP), iminodisuccinic acid (IDS), Imino diacetic acid (IDA), N-(2-sulfomethyl)aspartic acid (SMAS), N-(2-sulfoethyl)aspartic acid (SEAS), N-(2-sulfomethyl)glutamic acid (SMGL), N-(2-sulfoethyl)glutamic acid (SEGL), N-methyliminodiacetic acid (MIDA), alanine-N,N-diacetic acid (ALDA), serine-N,N-diacetic acid (SEDA), isoserine-N,N-diacetic acid (ISDA), phenylalanine-N,N-diacetic acid (PHDA), anthranilic acid-N,N-diacetic acid (ANDA), sulfanilic acid-N,N-diacetic acid (SLDA), taurine-N,N-diacetic acid (TUDA) and sulfomethyl-N,N-diacetic acid (SMDA) and alkali metal salts or ammonium salts thereof. Also suitable is ethylenediamine disuccinate ("EDDS"), especially the [S,S] isomer as described in U.S. Pat. No. 4,704,233. Furthermore, Hydroxyethyleneiminodiacetic acid, Hydroxyiminodisuccinic acid, Hydroxy ethylene diaminetriacetic acid are also suitable. Particularly preferred is alanine, N,N-bis(carboxymethyl)-, trisodium salt.

Other chelants include homopolymers and copolymers of polycarboxylic acids and their partially or completely neutralized salts, monomeric polycarboxylic acids and hydroxycarboxylic acids and their salts. Preferred salts of the abovementioned compounds are the ammonium and/or alkali metal salts, i.e. the lithium, sodium, and potassium salts, and particularly preferred salts are the sodium salts.

Suitable polycarboxylic acids are acyclic, alicyclic, heterocyclic and aromatic carboxylic acids, in which case they contain at least two carboxyl groups which are in each case separated from one another by, preferably, no more than two carbon atoms. Polycarboxylates which comprise two carboxyl groups include, for example, water-soluble salts of, malonic acid, (ethylenedioxy) diacetic acid, maleic acid, diglycolic acid, tartaric acid, tartronic acid and fumaric acid. Polycarboxylates which contain three carboxyl groups include, for example, water-soluble citrate. Correspondingly, a suitable hydroxycarboxylic acid is, for example, citric acid. Another suitable polycarboxylic acid is the homopolymer of acrylic acid. Preferred are the polycarboxylates end capped with sulfonates.

Amino phosphonates are also suitable for use as chelating agents and include ethylenediamine tetrakis(methylenephosphonates) as DEQUEST. Preferred, these amino phosphonates that do not contain alkyl or alkenyl groups with more than about 6 carbon atoms.

Polyfunctionally-substituted aromatic chelating agents are also useful in the compositions herein such as described in U.S. Pat. No. 3,812,044. Preferred compounds of this type in acid form are dihydroxydisulfobenzenes such as 1,2-dihydroxy-3,5-disulfobenzene.

Further suitable polycarboxylate chelants for use herein include citric acid, lactic acid, acetic acid, succinic acid, formic acid all preferably in the form of a water-soluble salt. Other suitable polycarboxylates are oxodisuccinates, carboxymethyloxysuccinate and mixtures of tartrate monosuccinic and tartrate disuccinic acid such as described in U.S. Pat. No. 4,663,071.

Corrosion Inhibitor/Metal Protector

The detergent composition may also include a corrosion inhibitor. In general, it is expected that the corrosion inhibitor component will loosely hold calcium to reduce precipitation of any calcium carbonate (when this is used as an alkalinity source) once it is subjected to a pH of at least 8.0.

Exemplary corrosion inhibitors include phosphonocarboxylic acids, phosphonates, phosphates, polymers, and mixtures thereof. Exemplary phosphonocarboxylic acids include those available under the name Bayhibit™ AM from Bayer, and include 2-phosphonobutane-1,2,4, tricarboxylic acid (PBTC). Exemplary phosphonates include amino tri (methylene phosphonic acid), 1-hydroxy ethylidene 1-1-diphosphonic acid, ethylene diamine tetra (methylene phosphonic acid), hexamethylene diamine tetra (methylene phosphonic acid), diethylene triamine penta (methylene phosphonic acid), and mixtures thereof. Exemplary phosphonates are available under the name Dequest™ from Monsanto. Exemplary polymers include polyacrylates, polymethacrylates, polyacrylic acid, polyitaconic acid, polymaleic acid, sulfonated polymers, copolymers and mixtures thereof. It should be understood that the mixtures can include mixtures of different acid substituted polymers within the same general class. In addition, it should be understood that salts of acid substituted polymers can be used. The useful carboxylated polymers may be generically categorized as water-soluble carboxylic acid polymers such as polyacrylic and polymethacrylic acids or vinyl addition polymers. Of the vinyl addition polymers contemplated, maleic anhydride copolymers as with vinyl acetate, styrene, ethylene, isobutylene, acrylic acid and vinyl ethers are examples. The polymers tend to be water-soluble or at least colloidally dispersible in water. The molecular weight of these polymers may vary over a broad range although it is preferred to use polymers having average molecular weights ranging between 1,000 up to 1,000,000, more preferably a molecular weight of 100,000 or less, and most preferably a molecular weight between 1,000 and 10,000.

The polymers or copolymers (either the acid-substituted polymers or other added polymers) may be prepared by either addition or hydrolytic techniques. Thus, maleic anhydride copolymers are prepared by the addition polymerization of maleic anhydride and another comonomer such as styrene. The low molecular weight acrylic acid polymers may be prepared by addition polymerization of acrylic acid or its salts either with itself or other vinyl comonomers. Alternatively, such polymers may be prepared by the alkaline hydrolysis of low molecular weight acrylonitrile homopolymers or copolymers. For such a preparative technique see Newman U.S. Pat. No. 3,419,502.

The corrosion inhibitor/metal protector can be provided in a range of about 0.05 wt. % to about 15 wt. %, and more preferably in a range between about 0.5 wt. % and about 10 wt. %, and most preferably between about 1% and 7.5% based on the weight of the concentrate. It should be understood that the polymers, phosphonocarboxylates, and phosphonates can be used alone or in combination.

Water Conditioning Polymer

In an embodiment the detergent compositions includes a water conditioning polymer. In some aspects a water conditioning polymer is a secondary builder or scale inhibitor for the detergent compositions. Without being limited to a particular theory, the combined use of the aminocarboxylate and water conditioning polymer provide a synergistic inhibition of scale build-up on treated surfaces employing the caustic-free detergent composition.

In an aspect, the water conditioning polymer is a polyacrylate, polycarboxylate or polycarboxylic acid. Exemplary polycarboxylates that can be used as builders and/or water conditioning polymers include, but are not limited to: those having pendant carboxylate ($—CO_2^-$) groups such as acrylic homopolymers, polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of water conditioning polymers, see Kirk-Othmer, Encyclopedia of Chemical Technology, Third Edition, volume 5, pages 339-366 and volume 23, pages 319-320, the disclosure of which is incorporated by reference herein.

According to an embodiment, the water conditioning polymer may be a non-phosphorus polymer. In a further embodiment, a neutralized polycarboxylic acid polymer is employed as the water conditioning polymer. An exemplary neutralized polycarboxylic acid is commercially-available as Acumer□ 1000 (Rohm & Haas Company).

In an aspect, the detergent compositions include from about 0.05 wt-%-15 wt-% water conditioning polymer, from about 0.1 wt-%-10 wt-% water conditioning polymer, preferably from about 1 wt-%-5 wt-% water conditioning polymer. The water conditioning polymer is present at a level such that a use solution of the detergent in hard water (e.g. 17 or 20 grain water hardness) does not lead to the formation of precipitate.

Anti-Redeposition Agent

The composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. In a preferred embodiment, the anti-redeposition agent, when included in the concentrate, is added in an amount between about 0.5 wt. % and about 10 wt. %, and more preferably between about 1 wt. % and about 5 wt. %.

Dispersants

Dispersants that can be used in the composition include maleic acid/olefin copolymers, polyacrylic acid, and mixtures thereof. The concentrate need not include a dispersant, but when a dispersant is included it can be included in an amount that provides the desired dispersant properties. Exemplary ranges of the dispersant in the concentrate can be between about 0 and about 20 wt. %, more preferably between about 0.5 wt. % and about 15 wt. %, and most preferably between about 2 wt. % and about 9 wt. %.

Additional Enzymes

Additional enzymes can be included in the composition to aid in soil removal of robust soils such as starch, protein, and the like. Exemplary types of enzymes include proteases, alpha-amylases, and mixtures thereof. Exemplary proteases that can be used include those derived from *Bacillus licheniformis, Bacillus lenus, Bacillus alcalophilus*, and *Bacillus amyloliquefacins*. Exemplary alpha-amylases include those from *Bacillus subtilis, Bacillus amyloliquefaceins* and *Bacillus licheniformis*. The concentrate need not include an enzyme. When the concentrate includes an enzyme, it can be included in an amount that provides the desired enzymatic activity when the warewashing composition is provided as a use composition. Exemplary ranges of the additional enzyme in the concentrate include between about 0 and about 15 wt. %, more preferably between about 0.5 wt. % and about 10 wt. %, and most preferably between about 1 wt. % and about 5 wt. %.

Dyes, Odorants, and the Like

Various dyes, odorants including perfumes, and other aesthetic enhancing agents can be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like.

Fragrances or perfumes that may be included in the compositions include, for example, terpenoids such as citronellal, aldehydes such as amyl cinnamaldehyde, a jasmine such as C1S-jasmine or jasmal, vanillin, and the like.

Formulations

The detergents may be formulated in a ready to use solution or concentrated solution that is in any form including liquid, free flowing granular form, powder, solid block, gel, paste, slurry, and foam.

The ingredients are mixed to form a substantially homogeneous consistency wherein the ingredients are distributed substantially evenly throughout the mass. The mixture can be discharged from the mixing system through a die or other shaping means.

Methods of Use

Methods of use employing the detergent compositions are particularly suitable for manual ware washing. The cleaning compositions can be dispensed as a concentrate, a ready-to-use composition, or as a use solution. The compositions can be applied directly to an article to be cleaned, in a sink, or to water to form a use solution. The use solution can be applied to the article surface during a presoak application, immediately preceding the manual wash application, or during the manual wash application.

The detergents could also be used in institutional ware washing. Exemplary disclosure of warewashing applications is set forth in U.S. patent application Ser. Nos. 13/474,771, 13/474,780 and 13/112,412, including all references cited therein, which are herein incorporated by reference in its entirety. The method may be carried out in any consumer or institutional dish machine, including for example those described in U.S. Pat. No. 8,092,613, which is incorporated herein by reference in its entirety, including all figures and drawings. Some non-limiting examples of dish machines include door machines or hood machines, conveyor machines, undercounter machines, glasswashers, flight machines, pot and pan machines, utensil washers, and consumer dish machines. The dish machines may be either single tank or multi-tank machines.

A door dish machine, also called a hood dish machine, refers to a commercial dish machine wherein the soiled dishes are placed on a rack and the rack is then moved into the dish machine. Door dish machines clean one or two racks at a time. In such machines, the rack is stationary and the wash and rinse arms move. A door machine includes two sets arms, a set of wash arms and a rinse arm, or a set of rinse arms.

Door machines may be a high temperature or low temperature machine. In a high temperature machine the dishes are sanitized by hot water. In a low temperature machine the dishes are sanitized by the chemical sanitizer. The door machine may either be a recirculation machine or a dump and fill machine. In a recirculation machine, the detergent solution is reused, or "recirculated" between wash cycles. The concentration of the detergent solution is adjusted between wash cycles so that an adequate concentration is maintained. In a dump and fill machine, the wash solution is not reused between wash cycles. New detergent solution is added before the next wash cycle. Some non-limiting examples of door machines include the Ecolab Omega HT, the Hobart AM-14, the Ecolab ES-2000, the Hobart LT-1, the CMA EVA-200, American Dish Service L-3DW and HT-25, the Autochlor A5, the Champion D-HB, and the Jackson Tempstar.

Additional examples of applications of use for the detergent compositions include, for example, alkaline detergents effective as grill and oven cleaners, ware wash detergents, drain cleaners, hard surface cleaners, surgical instrument cleaners, dish wash presoaks, dish wash detergents, beverage machine cleaners, degreasers and burned-on soil removers.

In certain embodiments, the detergent composition may be mixed with a water source prior to or at the point of use. In other embodiments, the detergent compositions do not require the formation of a use solution and/or further dilution and may be used without further dilution.

In aspects employing solid detergent compositions, a water source contacts the detergent composition to convert solid detergent compositions, particularly powders, into use solutions. Additional dispensing systems may also be utilized which are more suited for converting alternative solid detergents compositions into use solutions. The methods include use of a variety of solid detergent compositions, including, for example, extruded blocks or "capsule" types of package In an aspect, a dispenser may be employed to spray water (e.g. in a spray pattern from a nozzle) to form a detergent use solution. For example, water may be sprayed toward an apparatus or other holding reservoir with the detergent composition, wherein the water dissolves the solid detergent composition to form the use solution. In certain embodiments, a use solution may be configured to drip downwardly due to gravity until the dissolved solution of the detergent composition is dispensed for use. In an aspect, the use solution may be dispensed into a tub or a sink, such as a 2- or 3-compartment sink, for manual washing or soaking of ware.

Use Compositions

The compositions include concentrate compositions and use compositions. For example, a concentrate composition can be diluted, for example with water, to form a use composition. In an embodiment, a concentrate composition can be diluted to a use solution before application to an object. For reasons of economics, the concentrate can be marketed and an end user can dilute the concentrate with water or an aqueous diluent to a use solution.

The level of active components in the concentrate composition is dependent on the intended dilution factor and the desired activity of the composition. Generally, a dilution of about 1 fluid ounce to about 10 gallons of water to about 10 fluid ounces to about 1 gallon of water is used for aqueous compositions. In some embodiments, higher use dilutions can be employed if elevated use temperature (greater than 25□ C) or extended exposure time (greater than 30 seconds) can be employed. In the typical use locus, the concentrate is diluted with a major proportion of water using commonly available tap or service water mixing the materials at a dilution ratio of about 3 to about 40 ounces of concentrate per 100 gallons of water.

In other embodiments, a use composition can include about 0.01 to about 10 wt-% of a concentrate composition and about 90 to about 99.99 wt. % diluent; or about 0.1 to about 1 wt. % of a concentrate composition and about 99 to about 99.9 wt. % diluent.

Amounts of an ingredient in a use composition can be calculated from the amounts listed above for concentrate compositions and these dilution factors. It is to be understood that all values and ranges between these values and ranges are encompassed by the present disclosure.

Sample Formulas

All are in percent by weight of the composition. Additional components as described herein can amount to as much as 0.001 to about 15 wt. % of the composition.

TABLE 1

| Component | Preferred range | More preferred | Most preferred |
|---|---|---|---|
| Enzyme (amylase and protease) | 0.001-20 | 0.01-15 | 0.05-10 |
| anionic surfactant | 5-60 | 8-55 | 10-45 |
| other surfactant | 0.01-35 | 0.5-30 | 1-25 |
| water | 35-80 | 40-75 | 45-70 |
| stabilizer | 0.05-15 | 0.1-10 | 1-5 |
| preservative | 0.001-1 | 0.005-0.5 | 0.01-0.1 |
| viscosity enhancer | 0.1-25 | 0.5-20 | 1-15 |
| additional components | 0-15 | 0-12 | 0-10 |

All publications and patent applications in this specification are indicative of the level of ordinary skill in the art to which this disclosure pertains. All publications and patent applications are herein incorporated by reference to the same extent as if each individual publication or patent application was specifically and individually indicated as incorporated by reference.

Embodiments are further defined in the following non-limiting Examples. It should be understood that these Examples, while indicating certain embodiments, are given by way of illustration only. From the above discussion and these Examples, one skilled in the art can ascertain the essential characteristics, and without departing from the spirit and scope thereof, can make various changes and modifications of the embodiments to adapt it to various usages and conditions. Thus, various modifications of the embodiments, in addition to those shown and described herein, will be apparent to those skilled in the art from the foregoing description. Such modifications are also intended to fall within the scope of the appended claims.

EXAMPLES

The scope of this project was to develop warewash detergent compositions utilizing the enzymatic soil removal technology with one or multiple enzymes. A commercially available inline liquid pot and pan detergent, was the benchmark product. Detergents with additional benefits such as soaking and complex soil removal are desirable. These products aim to provide both stronger soil removal performance and significant soaking benefits while maintaining similar physical and chemical properties of existing products (eg. dispensing profile, low alkalinity near neutral pH, and high foam). The commercial formula did not contain any enzymes and included a surfactant package of olefin sulfonate, lauryl ether sulfate, and amine oxide.

The following data were collected using test methods "Enzymatic Removal of Protein Soil in Hard-Surface Cleaning Applications" and "Enzymatic Removal of Starch Soil in Hard-Surface Cleaning Applications". Both methods utilize commercially made melamine tiles for soil removal performance evaluation. DM06, cheese (baked on) melamine tile, is used to represent protein soil on hard surface. DM79, potato starch (colored) melamine tile, is used to represent starch soil on hard surface. All tiles are evaluated by measuring the difference in light-dark reflection value, L, before and after a soaking test, ΔL, using a HunterLab colorimeter.

Liquanase Evity 3.5 L, a commercial protease from Novozymes, was identified as a typical example of a protease for testing under standard manual pot and pan conditions (eg. pH 8, 120 F, with high foam surfactants). Amplify 24 L, a commercial amylase from Novozymes, was identified as a typical amylase for testing under these conditions. Also, a recently commercialized amylase, Amplify Prime 100 L, was tested. The combination of Liquanase and Amplify (or Amplify Prime) showed significant benefits in both removal of protein rich soil and removal of starch rich soil over having a single enzyme present. The formulations discussed herein rely on the synergy of these protease-amylase combinations, but use of a single enzyme with an optimized surfactant package is also contemplated.

The anionic and amphoteric surfactants in benchmark detergent (olefin sulfonate, sodium lauryl ether sulfate, and amine oxide) were found to be synergistic with protease in protein soil removal, however, none of these surfactants were ideal with amylase. Therefore, in the new prototype enzymatic pot and pan formulations, a preferred surfactant for amylase performance was identified including the Branched Secondary Alcohol Ethoxylate Surfactant (polyethylene glycol trimethylnonyl ether, commercially available from Dow Chemical as Tergitol TMN-6) or a branched C8 ethyl hexyl $(PO)_5(EO)_9$ nonionic extended surfactant (commercially available from Dow Chemical as Ecosurf EH-9) and the addition of either was shown to boost the amylase performance and provide benefit in enzyme stability in the concentrate. Amphosol CG, a cocamidopropyl betaine (CAPB) commercially available from Stepan, was found to have very similar protease and amylase compatibilities, foam profile, and soil removal performance as SLES (sodium laurel ether sulfate). CAPB also adds the benefit of skin mildness. The overall formulation that includes Tergitol TMN-6 and CAPB is shown below.

TABLE 2

| Formula for experimental enzymatic pot and pan detergent, Prototype 6 | | |
|---|---|---|
| wt % | Ingredient/raw material | Category/Function |
| 59.88 | Additional components | Dye, preservative, fragrance, enzyme stabilizer, and water |
| 2.22 | Tergitol TMN-6 | Nonionic surfactant |
| 23.33 | Sodium Lauryl Ether Sulfate 60% and/or Sodium C14-16 Olefin Sulfonate | SLES, AOS: anionic surfactants, foam production |
| 2.9 | Liquanase Evity 3.5 L K/Amplify 24 L | enzymes |
| 11.67 | Amine oxide/cocamidopropyl betaine | Amphoteric surfactant, foam stabilization/skin mildness |

In performance testing, most of the prototype formulas were prepared without dye, fragrance, preservative, or enzymes. Enzymes were dosed into the RTU solution during tests. Addition of dye, fragrance and enzyme-compatible preservative does not alter the performance or stability of enzymes in any of the prototypes. Prototype 6 was compared to Prototype 1, an experimental formula with same surfactant package as a commercial detergent formula and with the addition of both enzymes, using the same detergent dose by weight and the same concentration of enzymes.

TABLE 3

| Formula for experimental enzymatic pot and pan detergent, Prototype 1 | | |
|---|---|---|
| wt % | Ingredient/raw material | Category/Function |
| 51.5 | Additional components | Water, salt, dye, coupler, preservative, fragrance, enzyme stabilizer |
| 0.5 | Alcohol Alkoxylate, C10 | XP-80, nonionic surfactant |
| 30.5 | Sodium Lauryl Ether Sulfate 60%/Sodium C14-16 Olefin Sulfonate | SLES, AOS: anionic surfactants, foam production |
| 15.6 | amine Oxide/cocamidopropyl betaine | Amphoteric surfactant, foam stabilization/skin mildness |
| 2.9 | Liquanase Evity 3.5 L K/Amplify | enzymes |

Figure 2:
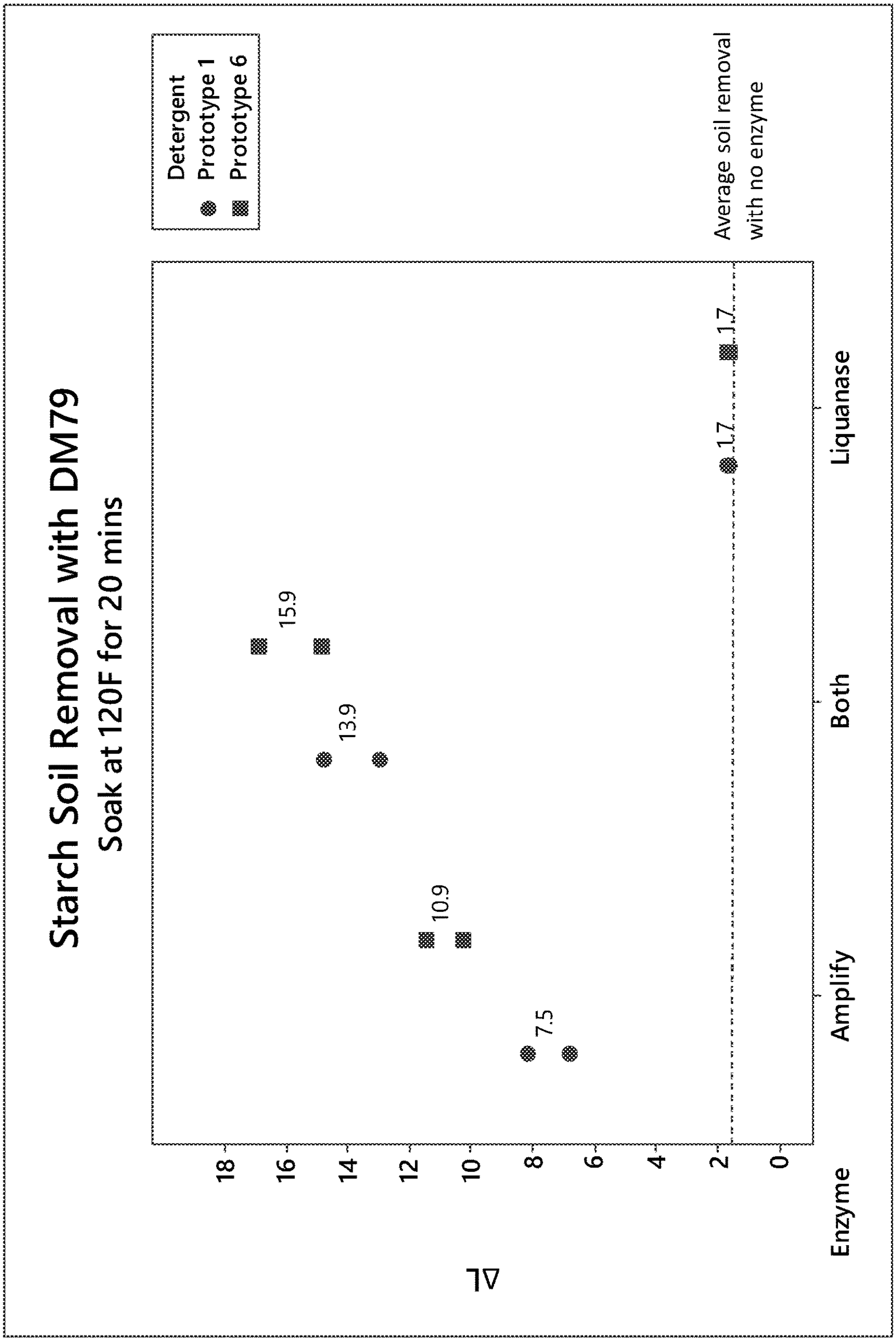
FIG. 2. Starch soil removal comparison using DM79 for detergent prototypes.

FIGS. 1 and 2 show plots for protein soil removal and starch soil removal for Prototypes 6 and 1 with Liquanase only, Amplify only, and both enzymes. The plots show there was no performance difference between prototypes 1 and 6 when only Liquanase was added. However, Prototype 6, with the inclusion of an amylase preferred surfactant, clearly showed better performance than Prototype 1 in conditions that involved Amplify, with and without Liquanase. In each of the figures, when both enzymes are present, there is a synergistic interaction between the protease and amylase. The dashed line shows the base response for surfactants alone, or any non-enzyme pot and pan formulation. When the enzymes are present together, synergy is demonstrated. This is true across the two different types of soils, which both contain a mix of protein and starch.

Figure 3:
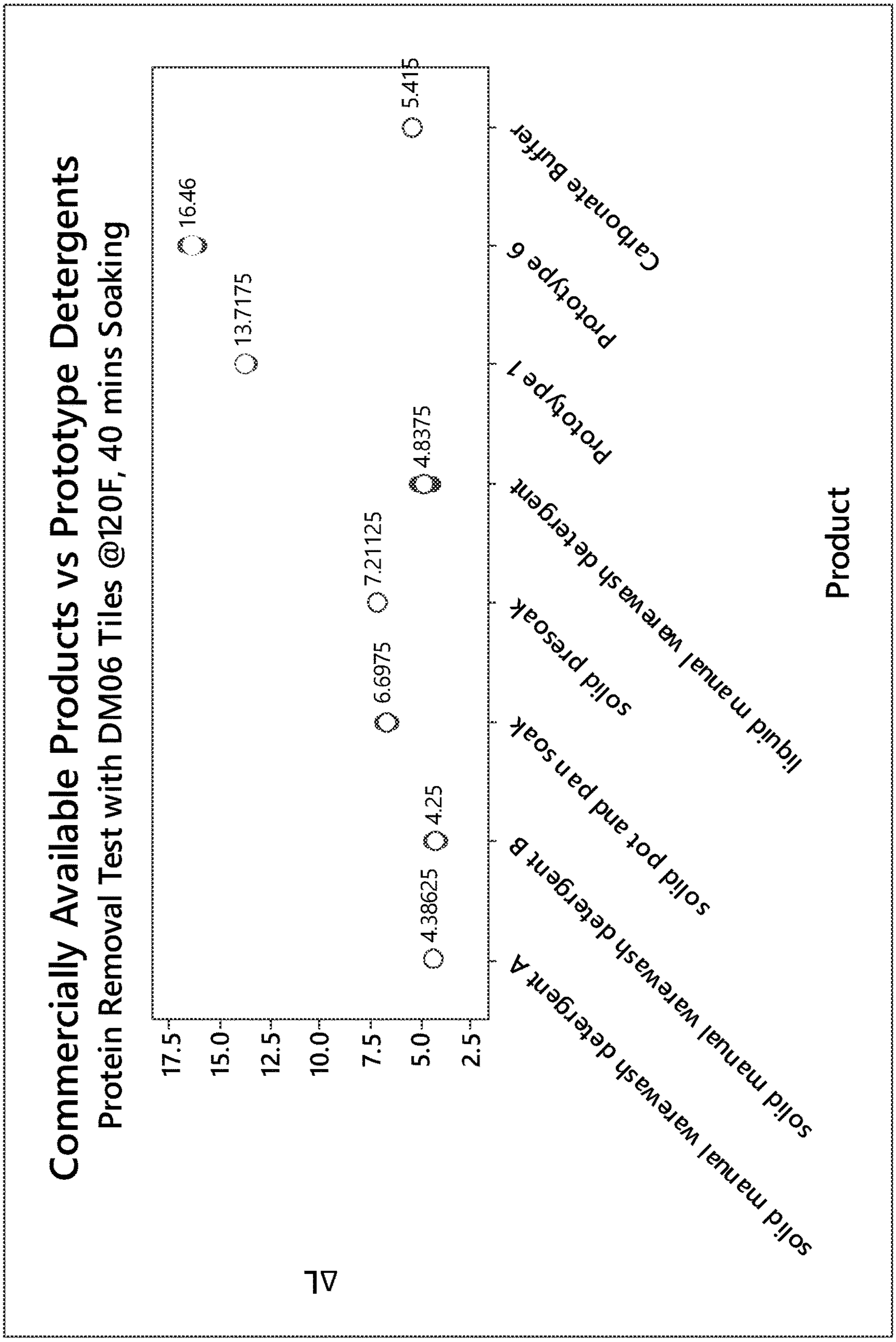
FIG. 3. Protein soil removal comparison of detergent Prototypes 1&6 vs non-enzymatic products.
Figure 4:
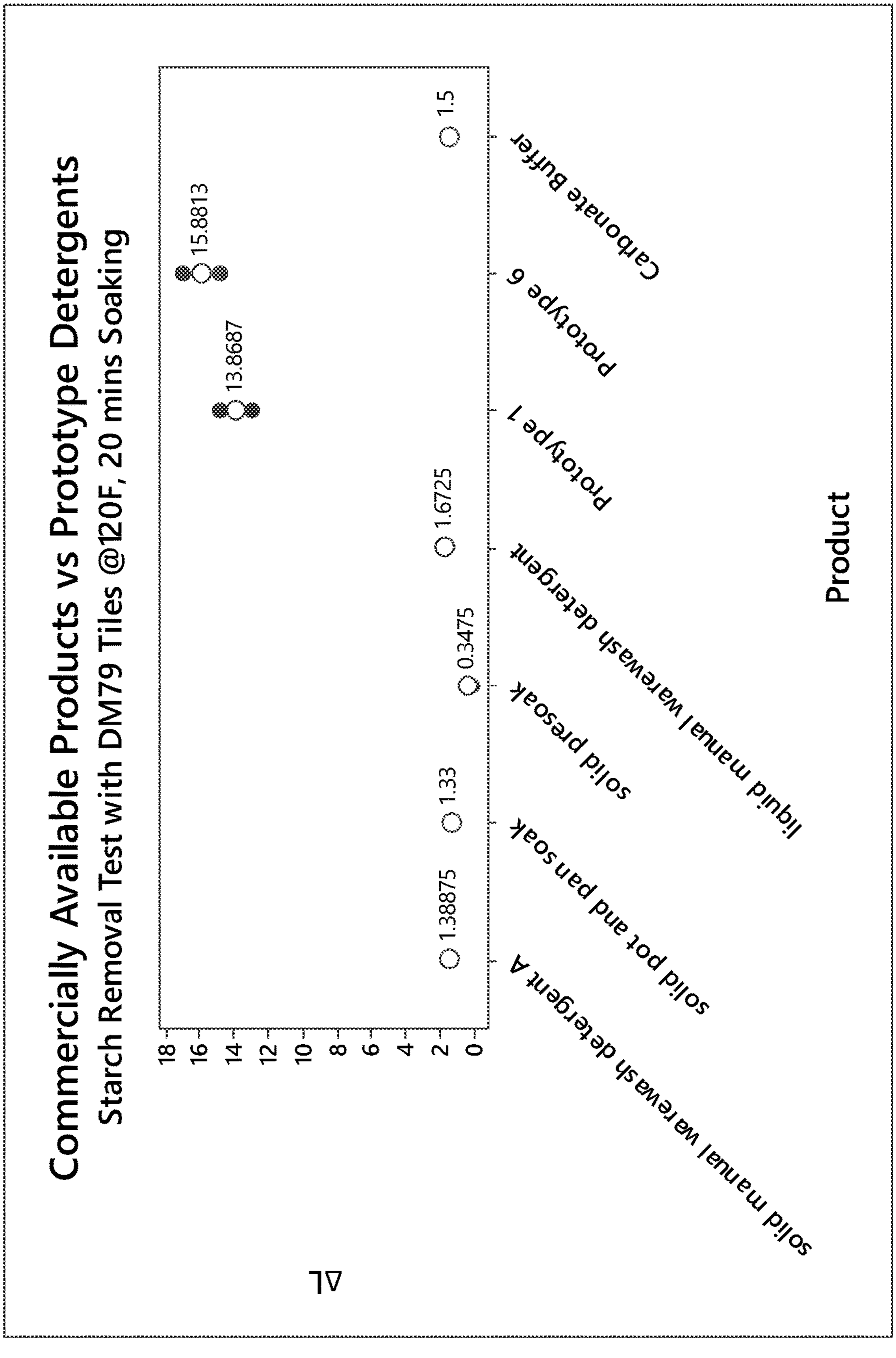
FIG. 4. Starch soil removal comparison of detergent Prototypes 1&6 vs non-enzymatic products.

The protein and starch soil removal performance of Prototypes 1 and 6 were also compared with other non-enzymatic pot and pan products. All of these products were dosed at their recommended high dose as shown in Table 4. The performance results are shown in FIGS. 3 and 4.

TABLE 4

| Product dose used in protein removal and starch removal comparison. | |
|---|---|
| Product | Dose (g/L) |
| Commercially available solid manual warewash detergent A | 0.63 |
| Commercially available solid manual warewash detergent B | 0.75 |
| Commercially available solid pot and pan soak | 3.75 |
| Commercially available solid presoak | 3.75 |
| Commercially available liquid manual warewash detergent | 1.12 |
| Prototype 1 | 1.12 |
| Prototype 6 | 1.12 |
| Carbonate Buffer (pH 9.5) | 1.00 (Sodium Bicarb.) |

Existing non-enzymatic products did not perform well on removal of protein rich or starch rich soil. Their performance was not much different from soaking the tiles in carbonate buffer solution. Enzymatic Prototypes 1 and 6 did significantly better in removing protein rich and starch rich soil as shown in FIGS. 3 and 4.

Several formulations were studied for enzyme shelf-life stability in the concentrates. Formulations were dosed with 1.5% w/w or 1.9% w/w of Liquanase Evity 3.5 L, 0.5% w/w or 1.0% w/w of Amplify 24 L, or a combination of both enzymes. Upon addition of enzyme/s, the samples were stored at 22 or 25° C., 30° C., 37° C., and 49° C. Time zero control samples were immediately frozen to preserve initial activity. Samples were pulled and frozen at incubation times of 2, 4, 8, and 12 weeks. Enzyme activity data are displayed as % Retention of enzyme activity relative to the initial recovery at time zero.

Five different formulations with Liquanase and Amplify were compared. Formula 1 is the inline commercially available liquid detergent, with enzymes added. Formula 2 is an experimental formula that focuses on quat-anionic interaction. Formulations 3, 4, and 5 are experimental surfactant packages that target improved amylase performance and stability. Formula 1 is shown in Table 1. Formulations 2, 3, 4, and 5 are shown in the tables below:

TABLE 5

| Formula 2 | | |
|---|---|---|
| Ingredient/raw material | Wt % | Active % |
| Soft Water | 53.3 | |
| Glucopon 625UP (50% active) alkyl polyglucoside surfactant | 10.0 | 5 |
| Barlox 12 (30% active)(cocamine oxide) | 15.0 | 4.5 |
| SLES (60% active) | 16.7 | 10 |
| Variquat CC-42 (coco alkyl bis (hydroxyethyl) methyl ammonium chloride) | 5.0 | 5 |

TABLE 6

| Formula 3 | | |
|---|---|---|
| Ingredient/raw material | Wt % | Active % |
| Soft Water | 56.8 | |
| Bioterge AS-40K (40% active) (aqueous solution of alpha olefin sulfonate) | 12.5 | 5 |
| Barlox 12 (30% active) | 16.7 | 5 |
| SLES (60% active) | 8.3 | 5 |
| Tergitol TMN-6 (87% active) | 5.7 | 5 |

TABLE 7

| Formula 4 | | |
|---|---|---|
| Ingredient/raw material | Wt % | Active % |
| Soft Water | 45.8 | |
| SLES (60% active) | 8.3 | 5 |
| Barlox 12 (30% active) | 16.7 | 5 |
| Bioterge AS-40K (40% active) | 12.5 | 5 |
| Amphosol CG (30% active)(cocamidopropyl betaine | 16.7 | 5 |

TABLE 8

| Formula 5 | | |
|---|---|---|
| Ingredient/raw material | Wt % | Active % |
| Soft Water | 57.5 | |
| SLES (60% active) | 8.3 | 5 |
| Barlox 12 (30% active) | 16.7 | 5 |
| Bioterge AS-40K (40% active) | 12.5 | 5 |
| Ecosurf EH-6 (100% active) (branched C8 ethyl hexyl $(PO)_5(EO)_6$ nonionic extended surfactant) | 5.0 | 5 |

Figure 5:
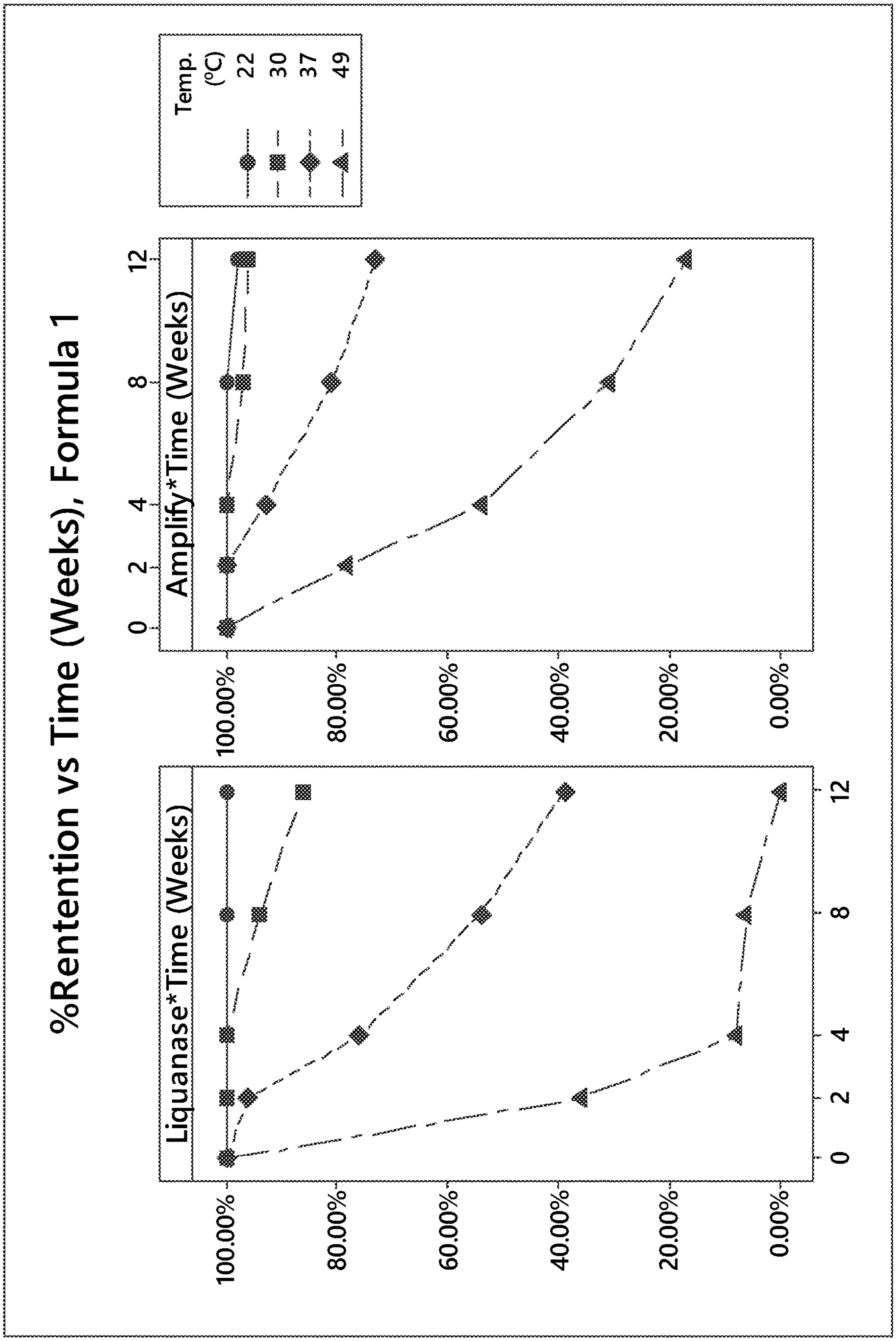
FIG. 5. Liquanase and Amplify stability in detergent Prototype 1 over 12 weeks at various temperatures.

FIG. 5 shows the relative retention of Liquanase and Amplify, added to the formula separately, at four temperatures over a 12 week period for Formula 1. Both enzymes have excellent stability at 30° C. or lower and acceptable stabilities at 37° C. Storage at 49° C. is not typically recommended for liquid enzyme formulations; therefore, data at 49° C. should not be a limiting factor for formulating with enzymes. The data for 49° C. in the plot serves the purpose to compare formula impact on enzyme stabilities.

Figure 6:
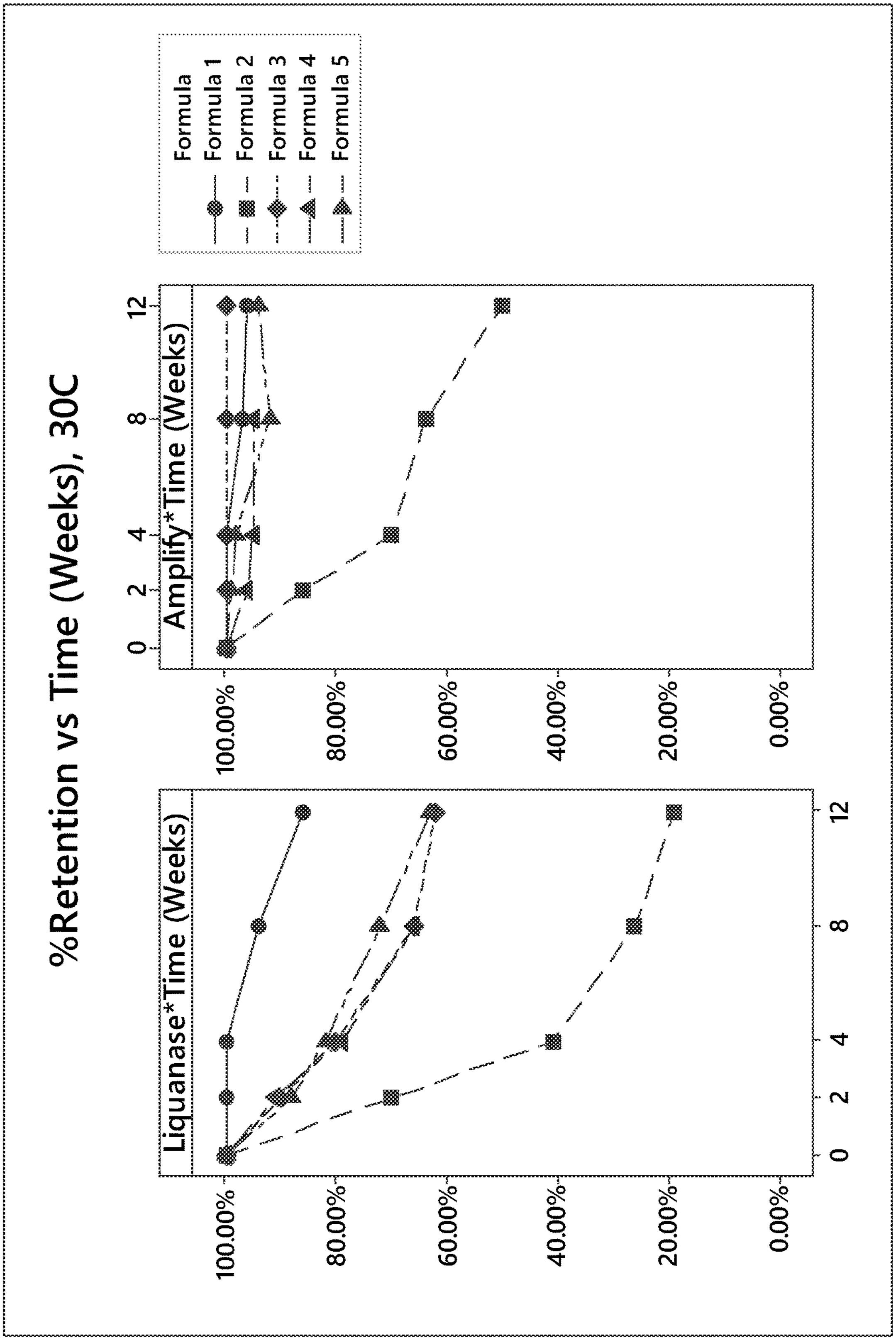
FIG. 6. Comparison of Liquanase and Amplify stability in five formulations over 12 weeks at 30° C.

FIG. 6 charts the relative retention of Liquanase and Amplify, added to the formula separately, at 30° C. over a 12 week period for Formulas 1 through 5. Formula 2 clearly had a negative effect on both Liquanase and Amplify stabilities compared to the other four formulas. Formulas 1, 3, 4, and 5 all showed excellent Amplify stability after 12 weeks at 30° C. Formula 1 had surprisingly better Liquanase stability than Formula 3, 4, and 5 and was likely aided by the presence of propylene glycol in Formula 1. Single surfactant changes between Formulas 3, 4, and 5 did not impact stability of either enzyme, indicating the 3 surfactants are interchangeable.

Two leading prototype formulas, Prototype 6 and Prototype 9, are compared to Prototype 1, the inline commercial liquid detergent formula with enzymes added. The formulas of Prototype 6 and Prototype 1 are listed in Table 2 and Table 3, respectively. Prototype 9 is very similar to Prototype 6 except the replacement of Tergitol TMN-6 with Ecosurf EH-9. Ecosurf EH-9 provides similar amylase compatibility as Tergitol TMN-6 and EcosurfEH-6.

TABLE 9

| Formula bill of materials for experimental enzymatic pot and pan detergent, Prototype 9 | | |
|---|---|---|
| wt % | Description | Category/Function |
| 60.3 | Water Zeolite Softened | Water, dye, preservative, fragrance, enzyme stabilizer, and viscosity enhancer |
| 2.22 | Ecosurf EH-9 | Nonionic, amylase performance and stability enhancement |
| 23.3 | Sodium Lauryl Ether Sulfate 60%/Sodium C14-16 Olefin Sulfonate | Anionic surfactant |
| 2.9 | Liquanase Evity 3.5 L K/Amplify 24 L | enzyme |
| 11.7 | Lauryl Dimethylamine Oxide 30%/ Cocoamidopropyl Betaine, 40% | Amphoteric surfactant |

Figure 7:
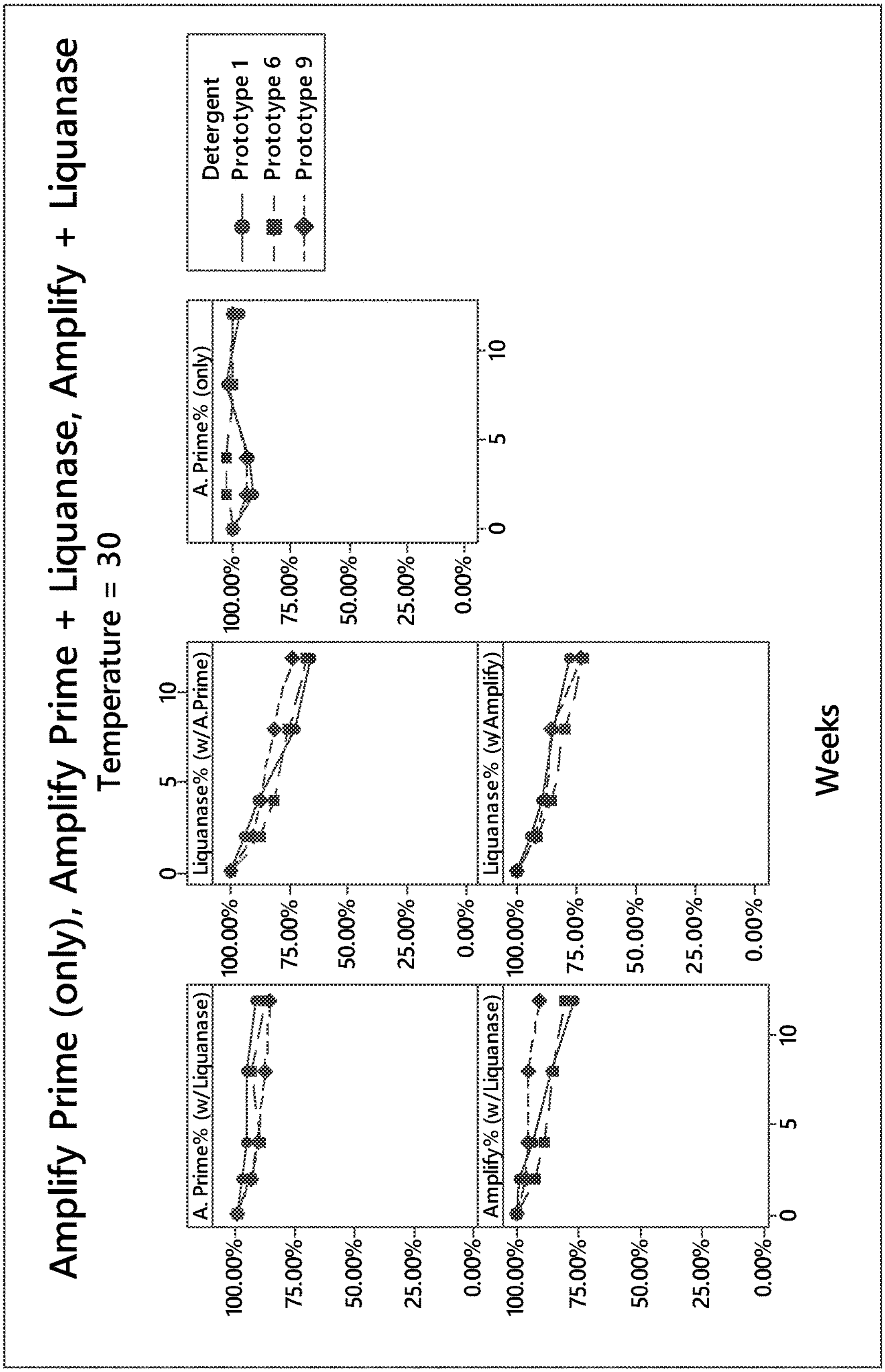
FIG. 7. Comparison of enzyme shelf-life stability in three detergent prototypes at 30° C.
Figure 8:
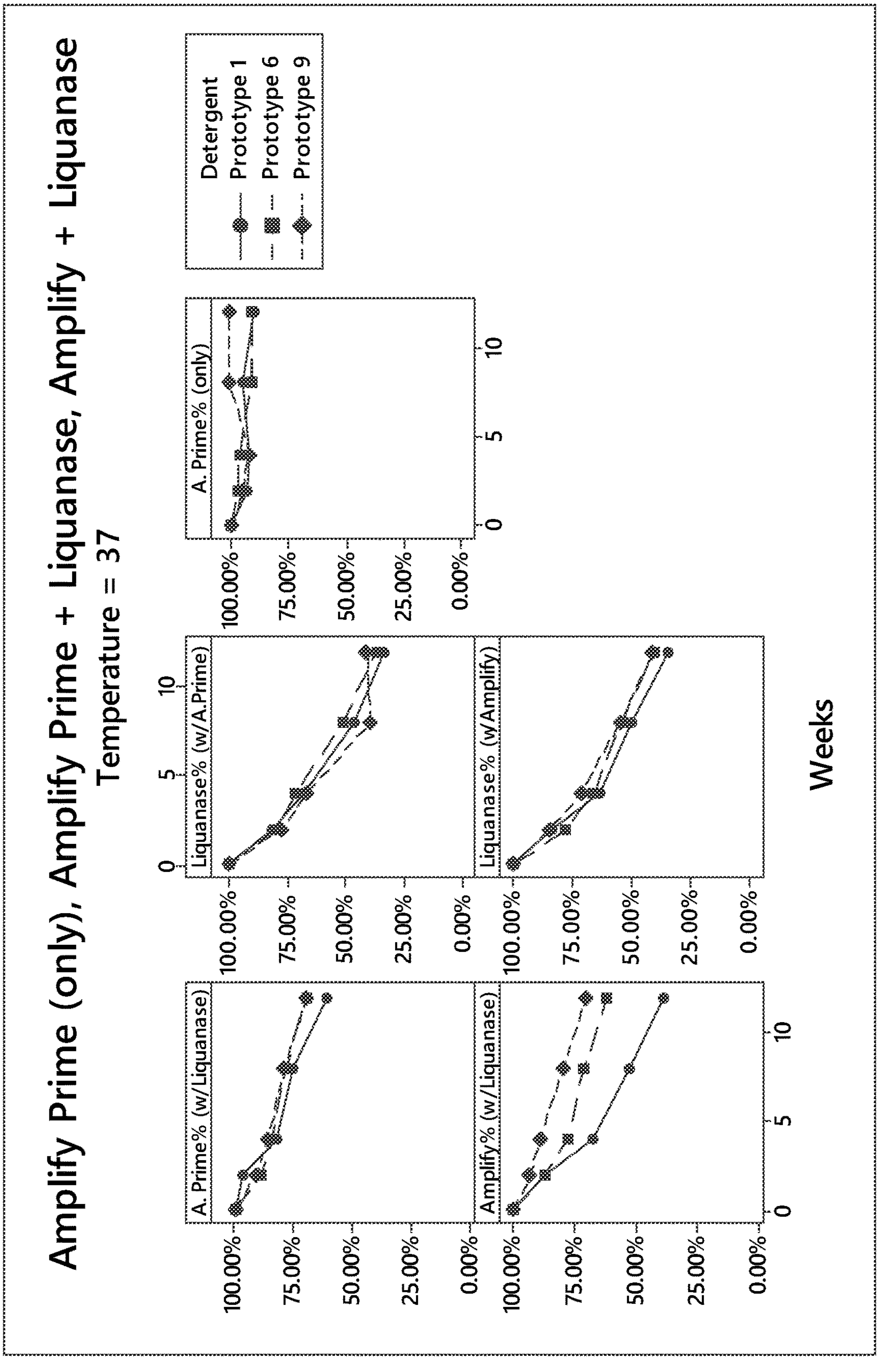
FIG. 8. Comparison of enzyme shelf-life stability in three detergent prototypes at 37° C.
Figure 9:
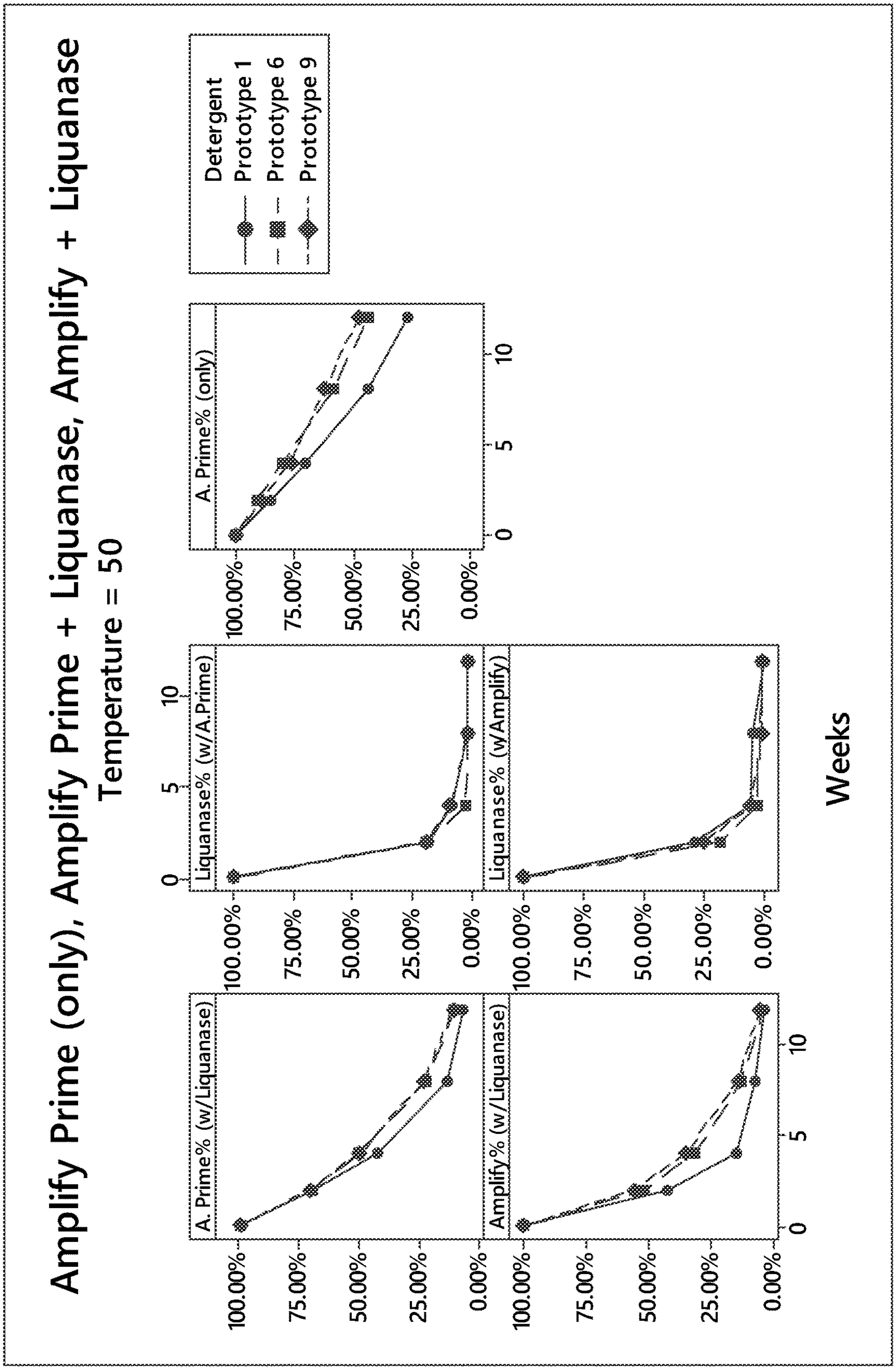
FIG. 9. Comparison of enzyme shelf-life stability in three detergent prototypes at 50° C.

12-week stability data of Prototypes 1, 6, and 9 with 1% Amplify Prime, 1% Amplify Prime with 1.9% Liquanase, and 1% Amplify with 1.9% Liquanase are shown in FIGS. 7-9.

There is not much difference in enzyme stabilities between these 3 prototype formulas at 30° C. or below. Amplify Prime alone in concentrate formulas has the best stability, but all enzymes combinations exhibit great stability profiles. At 37° C., the formulation impact on enzyme stabilities became more significant (FIG. 8). Amplify, the less robust amylase of the two, lost activity faster in Prototype 1 than Prototypes 6 and 9. At 50° C., both Amplify and Amplify Prime had worse stability in Prototype 1 than Prototype 6 and 9. These observations indicated having amylase compatible surfactants (Tergitol TMN-6, Ecosurf EH-9, etc.) in the formulas can improve amylase shelf-life stability. However, there is no difference in Liquanase stability between these formulations. Also, these full formulas had significantly better enzymes stabilities than the experimental surfactant packages shown in FIG. 6, suggesting that the additional ingredients present in the full formulas, and resultant decrease in water activity, supported enhanced stability. Specifically, the 2% propylene glycol was likely the key contributing factor.

Example 2 Deleterious Enzyme Surfactant Interactions

A prototype enzymatic test formulation (Table 10) was used to screen the overall performance of protease for a large range of surfactants. The same method was used as before with commercially available melamine tiles, DM06, with a baked on cheese soil. The screening conditions were optimized to provide a dynamic response range and response variability that supports differentiation between the protease-surfactant pairings. On the basis of the performance results obtained (detailed below), surfactants were grouped into three categories: synergistic, compatible or antagonistic with protease.

TABLE 10

| Protease Screening Formula | | |
|---|---|---|
| Component | Name | Target Amount |
| Surfactant | see list below | 250 ppm, actives basis |
| Chelant | | 50 ppm of RM |
| Polymer | | 100 ppm of RM |
| Enzyme | Protease A | 80 ppm of RM |
| Buffer | Sodium Bicarbonate | 1000 ppm |
| Water | 5 grain water | (to1 kg total) |

The formula above was prepared by mixing all ingredients except enzyme in a 1 L beaker. The solution was adjusted to pH 9.50 (at room temperature) using NaOH and was heated in a water bath to 120° F. Enzyme was added to the heated solution immediately prior to the tiles being immersed. Two tiles were soaked in each solution for 40 minutes. Where additional replicates were run, a separate solution was prepared for each set of 2 tiles. Performance response was measured in terms of the Reflectance change, ΔL, recorded for the treated and untreated tiles. Larger ΔL values represent greater soil removal.

TABLE 11

| Average ΔL Values for Protease A. | |
|---|---|
| Surfactant | Ave ΔL |
| *Barlox 12* | *15.6* |
| *Sodium Lauryl Ether Sulfate* | *15.6* |
| *Bioterge AS-40* | *15.3* |
| **Ecosurf EH-6** | **14.5** |
| **Tergitol TMN-6** | **14.0** |
| No Surfactant | 13.3 |
| *Linear Alkylbenzene Sulfonate* | *11.6* |

Italics—Synergistic; BOLD—Compatible; underlined italic—Antagonistic.

As can be seen, while several surfactants are synergistic or compatible with Protease A, LAS is antagonistic to protease activity.

The same test was run with Protease B and combinations and various surfactants in the same test formula. The results are reported in Table 12. Here again, while many surfactants were shown to be synergistic or at least compatible, LAS was shown to be antagonistic to protease activity.

TABLE 12

| Average ΔL Values for Protease B. | |
|---|---|
| Surfactant | Ave ΔL |
| *Barlox 12* | 15.9 |
| *Bioterge AS-40* | 15.9 |
| *Sodium Lauryl Ether Sulfate* | 15.7 |
| **Ecosurf EH-6** | **14.6** |
| No Surfactant | 14.5 |
| *Linear Alkylbenzene Sulfonate* | *12.8* |

Italic—Optimized; BOLD—Compatible; Italics underlined—Antagonistic.

Applicants have surprisingly found that LAS is deleterious to enzyme cleaning for both proteases, while the closely related surfactant, SLES and AOS are synergistic with each protease.

It will be obvious that compositions and methods may be varied in many ways. Such variations are not to be regarded as a departure from the spirit and scope of the embodiments and all such modifications are intended to be included within the scope of the following claims.

What is claimed is:

1. An enzyme surfactant component for inclusion in a detergent composition that optimizes the cleaning ability of the enzyme comprising:
- from about 0.01 wt. % to about 5 wt. % of a combination of a protease enzyme and an amylase enzyme;
- from about 10 wt. % to about 45 wt. % of a sodium olefin sulfonate and/or a sodium lauryl ether sulfate;
- from about 1 wt. % to about 25 wt. % of one or more amphoteric surfactants comprising lauryl dimethylamine oxide;
- from about 0.1 wt. % to about 5 wt. % of an alcohol alkoxylate comprising both ethylene oxide and propylene oxide polymer segments, wherein the alcohol alkoxylate is a branched C8 ethyl hexyl $(PO)_5(EO)_9$ nonionic extended surfactant; and
- from about 0.1 wt. % to about 5 wt. % of an enzyme stabilizer comprising propylene glycol;
- wherein said component is free of alkyl benzene sulfonate.

2. A detergent comprising the enzyme surfactant component of claim 1.

3. The detergent of claim 2 further comprising a preservative.

4. The detergent of claim 2 further comprising a viscosity enhancer.

5. The detergent of claim 2 further comprising one or more additional components of dye, fragrance, water, an alkalinity source, a chelant, additional enzyme, a dispersant, a bleaching agent, or a defoaming agent.

6. The detergent of claim 2 wherein said detergent is in liquid form.

7. A warewash/soak detergent composition comprising:
- from about 0.01 wt. % to about 5 wt. % of a combination of a protease enzyme and an amylase enzyme;
- from about 10 wt. % to about 45 wt. % of a sodium olefin sulfonate and/or sodium lauryl ether sulfate;
- from about 1 wt. % to about 25 wt. % of an amphoteric surfactant comprising lauryl dimethylamine oxide;
- from about 0.1 wt. % to about 5 wt. % of an alcohol alkoxylate comprising both ethylene oxide and propylene oxide polymer segments, wherein the alcohol alkoxylate is a branched C8 ethyl hexyl $(PO)_5(EO)_9$ nonionic extended surfactant;
- from about 0.1 wt. % to about 5 wt. % of an enzyme stabilizer comprising propylene glycol;
- with the remainder comprising one or more of water, a viscosity enhancer, a preservative, fragrance and dye,
- wherein said component is free of alkyl benzene sulfonate.

8. The warewash/soak composition of claim 7 wherein said amylase is an alpha amylase.

9. The warewash/soak composition of claim 7 wherein said protease is one or more of a serine protease, cysteine protease, carboxyl protease and/or metalloprotease.

10. The warewash/soak composition of claim 7, wherein said protease is bacteria-, actinomycete-, mold- or yeast-derived protease.

11. The composition of claim 7 wherein said protease is a bacterial protease.

12. The warewash/soak composition of claim 7, wherein the amylase is derived from a yeast, a mold, or a bacterium.

13. The warewash/soak composition of claim 7 wherein said amylase is derived from *Bacillus*, including *B. licheniformis, B. amyloliquefaciens, B. subtilis*, or *B. stearothermophilus.*

14. The composition of claim 7 wherein said composition is a concentrate composition to be diluted at the point of use.

15. A method of cleaning proteinaceous or starchy soils comprising:

applying a detergent composition comprising the enzyme surfactant component of claim 1 to a ware surface in a sink and/or prior to cleaning in a dish machine; and there after rinsing said ware, wherein said detergent provides improved protein or starchy soil removal and acceptable foaming for manual dish washing performance.

16. The method of claim 15 wherein said detergent is a ready to use solution.

17. The method of claim 15 wherein said dish machine is an institutional dish machine.

18. The method of claim 15 wherein said dish machine is a clean in place machine.

* * * * *